US012487739B2

(12) United States Patent
McCracken et al.

(10) Patent No.: US 12,487,739 B2
(45) Date of Patent: Dec. 2, 2025

(54) METHODS AND APPARATUSES FOR PROVIDING CONDENSABLE USER INTERFACE

(71) Applicant: Shopify Inc., Ottawa (CA)

(72) Inventors: Louis McCracken, Annadale, VA (US); Sabrina Majeed, Dallas, TX (US); Robert Schlegel, Westminster, CO (US); Darren Hebner, Toronto (CA); Zanna Balarin, Santa Barbara, CA (US); Louise Heng, Montreal (CA)

(73) Assignee: Shopify Inc., Ottawa (CA)

( * ) Notice: Subject to any disclaimer, the term of this patent is extended or adjusted under 35 U.S.C. 154(b) by 0 days.

(21) Appl. No.: 17/873,336

(22) Filed: Jul. 26, 2022

(65) Prior Publication Data

US 2023/0393726 A1 Dec. 7, 2023

Related U.S. Application Data

(60) Provisional application No. 63/348,225, filed on Jun. 2, 2022.

(51) Int. Cl.
*G06F 3/0485* (2022.01)
*G06F 3/0488* (2022.01)

(52) U.S. Cl.
CPC .......... *G06F 3/0485* (2013.01); *G06F 3/0488* (2013.01)

(58) Field of Classification Search
CPC .. G06F 3/0488; G06F 3/0485; G06F 3/04855; Y10S 715/973
See application file for complete search history.

(56) References Cited

U.S. PATENT DOCUMENTS

| | | | | |
|---|---|---|---|---|
| 8,237,712 B2 * | 8/2012 | Fagans | .................. | G06F 3/0481 |
| | | | | 715/764 |
| 8,359,545 B2 * | 1/2013 | Pixley | .................. | G06F 3/0485 |
| | | | | 345/157 |
| 8,429,555 B2 * | 4/2013 | Cho | ........................ | G06F 3/0481 |
| | | | | 715/830 |
| 8,683,377 B2 * | 3/2014 | Zuverink | .............. | G06F 3/0488 |
| | | | | 715/786 |
| 8,760,474 B2 * | 6/2014 | Jain | ........................ | G06F 3/0482 |
| | | | | 345/672 |
| 8,875,044 B2 * | 10/2014 | Ozawa | ................ | G06F 3/04886 |
| | | | | 345/173 |
| 9,030,419 B1 * | 5/2015 | Freed | ...................... | G06F 16/54 |
| | | | | 345/169 |

(Continued)

FOREIGN PATENT DOCUMENTS

JP 2003044194 A * 2/2003

OTHER PUBLICATIONS

WIPO: International Search Report and Written Opinion relating to PCT application No. PCT/CA2023/050463, dated Jun. 8, 2023.

*Primary Examiner* — Benjamin Smith
(74) *Attorney, Agent, or Firm* — Rowand LLP; Peter Eschlboeck

(57) ABSTRACT

Apparatuses and methods for providing a condensable user interface (UI) are disclosed. A scrollable UI having a plurality of sections is outputted by a display device. A first signal corresponding to a first command to scroll the UI at a first scrolling rate is received. In response to a determination that the first scrolling rate exceeds a first threshold, one or more sections of the plurality of sections of the UI are condensed.

21 Claims, 14 Drawing Sheets

(56) References Cited

U.S. PATENT DOCUMENTS

| | | | |
|---|---|---|---|
| 9,035,973 B2* | 5/2015 | Matsuki | H04N 1/00458 |
| | | | 345/684 |
| 9,047,824 B2* | 6/2015 | Jain | G09G 5/34 |
| 9,201,582 B2* | 12/2015 | Sengoku | G06F 3/0485 |
| 9,400,598 B2* | 7/2016 | Pixley | G06F 3/04855 |
| 9,529,866 B2* | 12/2016 | Sethi | G06F 3/04855 |
| 9,727,223 B2* | 8/2017 | Cho | G06F 3/0481 |
| 9,772,762 B2* | 9/2017 | Kim | G06F 3/04883 |
| 9,785,330 B1* | 10/2017 | Yang | G06F 3/0488 |
| 9,823,832 B2* | 11/2017 | Shikolay | G06F 3/0488 |
| 9,841,876 B2* | 12/2017 | Carrigan | G06F 3/0485 |
| 9,864,486 B2* | 1/2018 | Joo | G06F 3/0485 |
| 10,025,396 B2* | 7/2018 | Fan | G06F 3/0485 |
| 10,025,451 B2* | 7/2018 | Jin | G06F 3/0488 |
| 10,175,873 B2* | 1/2019 | Desai | G06F 3/04883 |
| 10,185,487 B2* | 1/2019 | Loretan | G06F 3/0488 |
| 10,474,342 B2* | 11/2019 | Gup | G06F 3/011 |
| 10,503,388 B2* | 12/2019 | Zambetti | G06F 3/0485 |
| 10,551,941 B2* | 2/2020 | Fan | H04W 4/12 |
| 10,613,731 B2* | 4/2020 | Jeon | G06F 16/957 |
| 10,627,953 B2* | 4/2020 | Yamano | G06F 3/0354 |
| 10,691,230 B2* | 6/2020 | Zambetti | G06F 3/04845 |
| 10,848,832 B2* | 11/2020 | Chai | H04N 21/4312 |
| 10,866,719 B1* | 12/2020 | Bulusu | H04L 51/52 |
| 10,884,602 B2* | 1/2021 | Loretan | G06F 3/04855 |
| 10,963,142 B2* | 3/2021 | Platzer | G06F 3/0485 |
| 11,099,729 B1* | 8/2021 | Ho | G06F 3/04845 |
| 11,194,461 B2* | 12/2021 | Vincent | G09G 5/346 |
| 11,244,103 B2* | 2/2022 | McClendon | H04N 21/431 |
| 11,262,907 B2* | 3/2022 | Minami | H04N 1/00411 |
| 11,297,393 B2* | 4/2022 | Chai | H04N 21/482 |
| 11,314,402 B2* | 4/2022 | Karlsson | G06F 3/04847 |
| 11,537,286 B2* | 12/2022 | Ho | G06F 3/0482 |
| 11,625,153 B2* | 4/2023 | Clarke | G06F 3/0485 |
| | | | 715/788 |
| 11,695,996 B2* | 7/2023 | Chai | G06F 3/0485 |
| | | | 725/44 |
| 11,727,197 B2* | 8/2023 | McClendon | G06F 3/0488 |
| | | | 715/720 |
| 11,947,778 B2* | 4/2024 | Clarke | G06F 3/0488 |
| 12,039,159 B2* | 7/2024 | Ho | G06Q 30/0643 |
| 2005/0206658 A1* | 9/2005 | Fagans | G06F 3/0481 |
| | | | 345/660 |
| 2008/0168478 A1* | 7/2008 | Platzer | G06F 3/04883 |
| | | | 719/328 |
| 2008/0222558 A1* | 9/2008 | Cho | G06F 3/0481 |
| | | | 715/784 |
| 2009/0100373 A1* | 4/2009 | Pixley | G06F 3/0362 |
| | | | 715/786 |
| 2010/0077002 A1* | 3/2010 | Funch | G06F 16/24 |
| | | | 707/E17.014 |
| 2010/0122214 A1* | 5/2010 | Sengoku | G06F 3/0485 |
| | | | 715/830 |
| 2010/0125786 A1* | 5/2010 | Ozawa | G06F 3/04886 |
| | | | 715/702 |
| 2010/0125807 A1* | 5/2010 | Easterday | G06F 3/0485 |
| | | | 715/785 |
| 2010/0269038 A1* | 10/2010 | Tsuda | G06F 3/0485 |
| | | | 715/702 |
| 2011/0096096 A1* | 4/2011 | Matsuki | H04N 1/00448 |
| | | | 345/684 |
| 2011/0119578 A1* | 5/2011 | Schwartz | G06F 3/0485 |
| | | | 345/173 |
| 2012/0064946 A1* | 3/2012 | Voetberg | G06F 3/0481 |
| | | | 455/566 |
| 2012/0159393 A1* | 6/2012 | Sethi | G06F 16/248 |
| | | | 715/830 |
| 2013/0093769 A1* | 4/2013 | Fagans | G06F 3/0485 |
| | | | 345/428 |
| 2013/0106914 A1* | 5/2013 | Jain | G09G 5/34 |
| | | | 345/666 |
| 2013/0132894 A1* | 5/2013 | Pixley | G06F 3/03543 |
| | | | 715/786 |
| 2013/0227465 A1* | 8/2013 | Cho | G06F 3/0485 |
| | | | 715/784 |
| 2013/0268883 A1* | 10/2013 | Kim | G06F 3/04847 |
| | | | 715/784 |
| 2013/0326398 A1* | 12/2013 | Zuverink | G06F 3/0488 |
| | | | 715/830 |
| 2014/0015863 A1* | 1/2014 | Grieve | G09G 5/34 |
| | | | 345/660 |
| 2014/0173504 A1* | 6/2014 | Gup | G06F 3/005 |
| | | | 715/784 |
| 2014/0208259 A1* | 7/2014 | Desai | G06F 3/0485 |
| | | | 715/784 |
| 2014/0285529 A1* | 9/2014 | Jain | G09G 5/34 |
| | | | 345/684 |
| 2014/0285530 A1* | 9/2014 | Ohtsuka | G06F 1/3296 |
| | | | 345/684 |
| 2014/0292760 A1* | 10/2014 | Shikolay | G06F 3/0488 |
| | | | 345/428 |
| 2014/0331169 A1 | 11/2014 | Dubey et al. | |
| 2015/0153944 A1* | 6/2015 | Loretan | G06F 3/04855 |
| | | | 715/786 |
| 2015/0324376 A1* | 11/2015 | Jeon | G06F 16/957 |
| | | | 715/234 |
| 2015/0370424 A1* | 12/2015 | Joo | G06F 3/0485 |
| | | | 715/830 |
| 2015/0370426 A1* | 12/2015 | Carrigan | G11B 27/34 |
| | | | 345/173 |
| 2016/0170598 A1* | 6/2016 | Zambetti | G06F 3/0485 |
| | | | 715/784 |
| 2016/0209939 A1* | 7/2016 | Zambetti | G06F 3/0488 |
| 2017/0025096 A1* | 1/2017 | Fan | G06F 3/0482 |
| 2017/0255381 A1* | 9/2017 | Nakaizawa | G06F 3/04883 |
| 2017/0308277 A1* | 10/2017 | Platzer | G06F 3/04845 |
| 2018/0024718 A1* | 1/2018 | Yang | G06V 40/1335 |
| | | | 345/156 |
| 2018/0292921 A1* | 10/2018 | Fan | G06F 3/03543 |
| 2019/0087077 A1* | 3/2019 | Konishi | G06F 3/04855 |
| 2019/0277649 A1* | 9/2019 | Takayama | G06F 3/0485 |
| 2019/0278469 A1* | 9/2019 | Loretan | G06F 3/04855 |
| 2019/0286322 A1* | 9/2019 | Yamano | G06F 3/041 |
| 2020/0084515 A1* | 3/2020 | Chai | H04N 21/4826 |
| 2020/0110522 A1* | 4/2020 | Zambetti | G06F 3/0362 |
| 2020/0310611 A1* | 10/2020 | Vincent | G09G 5/393 |
| 2020/0356222 A1* | 11/2020 | Clarke | G06F 16/447 |
| 2020/0356590 A1* | 11/2020 | Clarke | G06F 3/04845 |
| 2020/0379619 A1* | 12/2020 | Ruan | G06F 40/103 |
| 2020/0379631 A1* | 12/2020 | Karlsson | G06F 3/04845 |
| 2021/0084379 A1* | 3/2021 | Chai | H04N 21/472 |
| 2021/0312118 A1* | 10/2021 | McClendon, Jr. | G06F 3/04812 |
| 2022/0114330 A1* | 4/2022 | McClendon | G06F 3/0485 |
| 2022/0121299 A1* | 4/2022 | De Vries | G06F 3/044 |
| 2022/0206647 A1* | 6/2022 | Clarke | G06F 16/447 |
| 2022/0321971 A1* | 10/2022 | Chai | G06F 3/0485 |
| 2023/0334228 A1* | 10/2023 | McClendon | H04N 21/812 |
| 2024/0201829 A1* | 6/2024 | Clarke | G06F 3/0485 |
| 2024/0272786 A1* | 8/2024 | McDonald | G06F 3/04883 |

* cited by examiner

METHODS AND APPARATUSES FOR PROVIDING CONDENSABLE USER INTERFACE

CROSS-REFERENCE TO RELATED APPLICATIONS

The present disclosure claims priority from U.S. provisional patent application No. 63/348,225, filed Jun. 2, 2022 and entitled "METHODS AND APPARATUSES FOR PROVIDING CONDENSABLE USER INTERFACE", the entirety of which is hereby incorporated by reference.

FIELD

The present disclosure relates to methods and apparatuses for providing a condensable user interface, in particular a scrollable user interface having one or more sections that condense in response to a scrolling rate.

BACKGROUND

In many software applications, information may be presented to the user via a scrollable user interface (UI). Such UIs are commonly logically divided into multiple sections, and the user can navigate through the sections by scrolling the UI up and down. A user can provide scroll commands using touch input, mouse input or keyboard input, for example. Software applications that employ such scrollable UIs include text editing/reading applications, image gallery applications, and calendar applications, among others.

SUMMARY

Some software applications present a large volume of information to the user on a single scrollable UI (e.g., an online form having many input fields, a long text document, a checkout page having many fillable sections, an image gallery having many images, etc.). Typically, a user who wishes to view a desired section of the UI (e.g., a section near the bottom) would need to scroll through the entire length of the UI to reach the desired section. This can involve the user making multiple swipe gestures (e.g., in the case of a touch-sensitive screen on a smartphone), repeatedly moving a scroll button on a mouse (e.g., in the case of a mouse-based input) or repeatedly pressing a scroll-down button (e.g., in the case of a keyboard-based input).

In many existing scrollable UIs, it can be tedious for a user to navigate through multiple sections of the UI before reaching a desired section (particularly if the desired section is near the bottom of the UI). In some cases, multiple user inputs (e.g., multiple swipe gestures or mouse clicks) or non-intuitive user inputs (e.g., complex touch gestures) are required to navigate through a UI that has a large volume of information. This can be tedious and time-consuming for the user, can result in erroneous user inputs (e.g., overshooting the desired section and having to scrolling back) and/or can require additional computing resources to process the repeated user inputs (e.g., repeated swipe gestures). The high likelihood that the user would overshoot the desired section and have to reverse the scrolling can also result in a further waste of time and computing resources. Such challenges are exacerbated by the limited size of the display screen (and hence need for more scrolling of the UI) on many consumer devices such as smartphones and tablets. It would be useful to provide improvements in how a user navigates a scrollable UI.

In various examples, the present disclosure provides methods and systems for implementing a UI in which sections of the UI may automatically condense in response to input that scrolls the UI at a rate exceeding a defined threshold. The condensed sections may automatically expand again when the scrolling rate slows or the scrolling stops. This provides a technical advantage in that a more efficient and effective manner of controlling a scrollable UI is provided. User interactions with the UI can be simplified and/or improved, particularly when such interactions are carried out via a device with smaller display screens. However, user interactions carried out on devices having larger display screens may also be improved by examples of the present disclosure.

In some examples, if the scrollable UI includes sections having input fields, when the UI is condensed the input fields of the condensed sections may be automatically completed with available information (e.g., extracted from a user profile). This provides a technical advantage in that user inputs can be reduced while enabling the user to quickly navigate to the sections of the UI that do require their input, thus simplifying user interactions and reducing use of computing resources.

In some examples, kinetic scrolling may be used to scroll the UI, in which the scroll rate automatically decreases over time when user input to scroll the UI is removed. The UI may, in such examples, automatically expand the condensed sections proportionate to the decreasing scroll rate. This may provide a practical advantage in that the UI behaves in a more intuitive and expected manner, thus enabling more efficient user interactions and improving the user experience.

In some examples, one or more sections of the UI may be dynamically resized (e.g., condensed or expanded) dependent on the scroll rate. This may also provide a technical advantage that the UI is adjusted dynamically in a way that is responsive to user input controlling the scroll rate, where the user input controlling the scroll rate may be indicative of the user's interest in a particular a section of the UI (e.g., a faster scroll rate for a section of less interest, and a slower scroll rate for a section of greater interest).

In some examples, when a section of the UI has been condensed (in response to the scroll rate exceeding a defined threshold), a heading and/or some of the content of the next section of the UI may be brought into view on the display screen without the user having to navigate through the entire content of the condensed section. This may provide the technical advantage that the user can more efficiently navigate to the desired section (e.g., by selecting the heading of the next section to bring the full content of the next section into view) without the apparatus having to render and display the contents of the condensed section. This may be useful for displaying a UI in which sections or particular content within the sections are rendered according to the user's position (e.g., based on the position of a cursor, based on the position of a viewport, etc.) on the UI, among other possible scenarios. Another technical advantage is that, by condensing a section of UI to bring another section into view, computing resources may be conserved because the content of the condensed section does not need to be rendered and displayed.

Examples of the disclosed methods and apparatuses may be implemented in a UI for any application, particularly where there is a large volume of information to be scrolled through, including image gallery applications, calendar applications, text reading/editing applications, and online forms, among others.

In an example aspect, the present disclosure describes an apparatus including a processing unit communicatively coupled to a display device. The processing unit is configured to: cause the display device to output a scrollable user interface (UI) having a plurality of sections; receive at least a first signal corresponding to a first command to scroll the UI at a first scrolling rate; and in response to a determination that the first scrolling rate exceeds a first threshold, condense one or more sections of the plurality of sections of the UI.

In some examples, the processing unit may be further configured to: in response to the determination that the first scrolling rate exceeds the first threshold, condense the one or more sections of the UI by an amount proportionate to the first scrolling rate.

In some examples, the one or more sections of the UI may be condensed during execution of the first command to scroll the UI.

In some examples, the processing unit may be further configured to: in response to a determination that scrolling of the UI has decreased in rate from the first scrolling rate or scrolling of the UI has stopped, expand the one or more sections of the UI.

In some examples, scrolling of the UI may automatically decrease in rate from the first scrolling rate in absence of input to maintain scrolling of the UI.

In some examples, expansion of the one or more sections of the UI may be proportionate to a decrease in rate in the scrolling of the UI.

In some examples, the processing unit may be further configured to determine that scrolling of the UI has decreased in rate from the first scrolling rate for at least a defined time period or scrolling of the UI has stopped for at least the defined time period prior to expanding the one or more sections of the UI.

In some examples, the processing unit may be further configured to: in response to the determination that the first scrolling rate exceeds a first threshold, condense the one or more sections of the UI to a first semi-condensed state; receive at least a second signal corresponding to a second command to scroll the UI at a second scrolling rate; and in response to a determination that the second scrolling rate exceeds a second threshold higher than the first threshold, condense one or more of the one or more sections of the UI to a second fully-condensed state.

In some examples, in the first semi-condensed state, a first category of visual elements may be omitted from each of the one or more of the one or more sections of the UI and a second category of visual elements may be maintained in each of the one or more sections of the UI, and in the second fully-condensed state both the first and the second categories of visual elements may be omitted from each of the one or more of the one or more sections of the UI.

In some examples, the processing unit may be further communicatively coupled to an input device to receive at least the first signal corresponding to the first command, and the input device may be a touch-sensitive device.

In some examples, at least the first signal received from the input device may represent a swipe gesture and the first scrolling rate may correspond to at least one of a speed, distance or acceleration of the swipe gesture.

In some examples, at least the first signal received from the input device may indicate a number of swipe gestures and the first scrolling rate may correspond to the number of swipe gestures.

In some examples, scrolling of the UI may automatically decrease in rate from the first scrolling rate following an end of the swipe gesture and in absence of another swipe gesture, and the one or more sections of the UI may be expanded in response to the scrolling of the UI decreasing in rate.

In another example aspect, the present disclosure describes method including: causing a display device of an electronic apparatus to output a scrollable user interface (UI) having a plurality of sections; receiving at least a first signal corresponding to a first command to scroll the UI at a first scrolling rate; and in response to a determination that the first scrolling rate exceeds a first threshold, condensing one or more sections of the plurality of sections of the UI.

In some examples, the method may further include: in response to the determination that the first scrolling rate exceeds the first threshold, condensing the one or more sections of the UI by an amount proportionate to the first scrolling rate.

In some examples, the method may further include: in response to a determination that scrolling of the UI has decreased in rate from the first scrolling rate or scrolling of the UI has stopped, expanding the one or more sections of the UI.

In some examples, scrolling of the UI may automatically decrease in rate from the first scrolling rate in absence of input to maintain scrolling of the UI.

In some examples, expansion of the one or more sections of the UI may be proportionate to a decrease in rate in the scrolling of the UI.

In some examples, the first signal corresponding to the first command may represent a swipe gesture detected by a touch sensor, scrolling of the UI may automatically decrease in rate from the first scrolling rate following an end of the swipe gesture and in absence of another swipe gesture, and the one or more sections of the UI may be expanded in response to the scrolling of the UI decreasing in rate.

In another example aspect, the present disclosure describes a non-transitory computer readable medium having instructions encoded thereon. The instructions, when executed by a processing unit of an apparatus, cause the apparatus to: cause a display device of the apparatus to output a scrollable user interface (UI) having a plurality of sections; receive at least a first signal corresponding to a first command to scroll the UI at a first scrolling rate; and in response to a determination that the first scrolling rate exceeds a first threshold, condense one or more sections of the plurality of sections of the UI.

In some examples, the computer readable medium may include instructions to implement any of the apparatuses or methods described above.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION

In various examples, the present disclosure describes methods and apparatuses for providing a scrollable user interface (UI) that is condensable. In some examples, the scrollable UI may be divided into sections, each of which may be individually condensable. In the present disclosure, "condensing" a section of a UI refers to a decrease in the size of the condensed section such that the condensed section occupies a smaller area of the display screen. Condensing a section may include operations such as reducing the size of the contents of the section (e.g., reducing font size, reducing image size, etc.), reducing or removing empty space in the section, removing certain elements (e.g., removing graphical elements) from the section, reducing contents of the section to a summary, replacing input fields with information automatically retrieved from a user profile, or reducing a section to a "read only" version (e.g., by removing interactive elements), among other possibilities, as will be discussed further below. A condensed section may be "expanded" to return the condensed section back to the original size. Expanding a condensed section may include reversing the operation(s) performed by the prior condensing. In some examples, when a condensed section is expanded, the expanded section may be rendered to reflect the state or content of the section before it was condensed. For example, if a navigation cursor or viewport was at a particular location (which may be referred to as a "checkpoint" or "bookmark") in the content before the section was condensed, when the section is expanded back to its original size, the content may be displayed with the navigation cursor or viewpoint at that particular location at the saved checkpoint (or bookmark).

Examples of the present disclosure may be implemented on various apparatuses including various computing devices. The apparatus may be any device capable of displaying a scrollable UI and enabling user interactions with the UI. For example, the apparatus may be a mobile device, a handheld device, a desktop device, or a wearable device, including a smartphone, a tablet device, a laptop device, an e-reader device, a smartwatch, a smart appliance, a desktop computer, or an electronic kiosk, among others.

Figure 1:
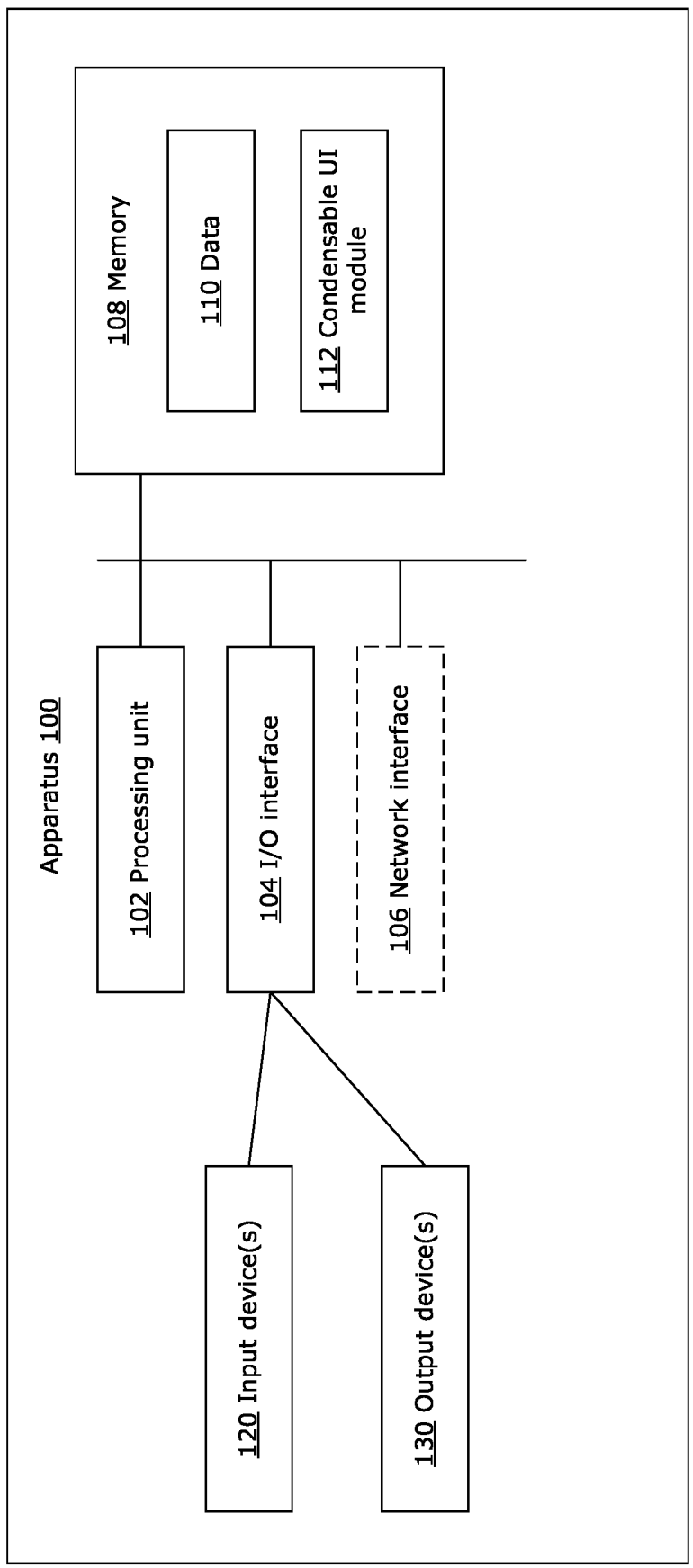
FIG. 1 is a block diagram of an example apparatus, in which examples of the present disclosure may be implemented.

FIG. 1 is a block diagram of an example apparatus 100, in accordance with some embodiments of the present disclosure. Although an example embodiment of the apparatus 100 is shown and discussed below, other embodiments may be used to implement examples disclosed herein, which may include components different from those shown. The apparatus 100 may be any suitable computing device as discussed above. Although FIG. 1 shows a single instance of each component, there may be multiple instances of each component shown.

The apparatus 100 includes at least one processing unit 102, such as a processor, a microprocessor, an application-specific integrated circuit (ASIC), a field-programmable gate array (FPGA), a dedicated logic circuitry, a dedicated artificial intelligence processor unit, or combinations thereof. The apparatus 100 also includes at least one input/output (I/O) interface 104, which interfaces with one or more input devices 120 and one or more output devices 130. The input device(s) 120 may include at least one device that enables a user to input commands to navigate (e.g., scroll) a scrollable UI; for example, the input device(s) may include a touch-sensitive device to enable touch input. The output device(s) may include at least one display device for outputting (e.g., displaying) the scrollable UI; for example, the output device(s) may include a display screen. The apparatus 100 may include or may couple to other input devices (e.g., a camera, mechanical buttons, microphone, keyboard, infrared sensor, etc.) and other output devices (e.g., speaker, vibration unit, lights, etc.). In some examples, the same component may serve as both input and output device (e.g., a touch-sensitive display that detects touch inputs as well as providing display outputs).

The apparatus 100 may include an optional network interface 106 for wired or wireless communication with a network (e.g., an intranet, the Internet, a P2P network, a WAN and/or a LAN) or other node. The network interface 106 may include wired links (e.g., Ethernet cable) and/or wireless links (e.g., one or more antennas) for intra-network and/or inter-network communications.

The apparatus 100 includes at least one memory 108, which may include a volatile or non-volatile memory (e.g., a flash memory, a random access memory (RAM), and/or a read-only memory (ROM)). The non-transitory memory 108 may store instructions for execution by the processing unit 102, such as to carry out examples described in the present disclosure. For example, the memory 108 may store instructions for executing a condensable UI module 112, which may cause the apparatus 100 to carry out methods disclosed herein. The memory 108 may include other software instructions, such as for implementing an operating system and other applications/functions. The memory 108 may also include data 110, such as images, text, calendar events, user data (e.g., user contact information, user home address, user preferences, etc.), etc.

In some examples, the apparatus 100 may also include one or more electronic storage units (not shown), such as a solid state drive, a hard disk drive, a magnetic disk drive and/or an optical disk drive. In some examples, one or more data sets and/or modules may be provided by an external memory (e.g., an external drive in wired or wireless communication with the apparatus 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The components of the electronic device 100 may communicate with each other via a bus, for example.

As mentioned above, in some examples a user may interact with a UI, displayed via a display device of the apparatus 100, via touch inputs. A touch-sensitive device on the apparatus 100 may generate touch data in response to detecting a touch, for example a user's finger touching a touchscreen display. Examples of suitable touch-sensitive devices include capacitive touch-sensitive devices, resistive touch-sensitive devices, infrared touch-sensitive devices and surface acoustic wave (SAW) touch-sensitive devices, among others. A touch-sensitive device may include an array of sub-units, for example, to enable detection of touch input over an area, including detection of touch input that travels (i.e., changes location) over time (e.g., a swipe gesture). Further, the touch-sensitive device may enable detection of parameters of the touch input, such as the speed, distance, direction and/or acceleration a touch input travels. The touch data may be provided to the processing unit 102, via the I/O interface 104, in real-time or near real-time. The I/O interface 104 may perform preprocessing operations on the touch data, for example normalization, filtering, denoising, etc., prior to providing the touch data to the processing unit 102. The touch data may represent a static touch input (e.g., where the location of the detected touch is substantially unchanged from the time the touch is detected to the time the touch is no longer detected) or a dynamic touch input (e.g., where the location of the detected touch is substantially changed from the time the touch is detected to the time the touch is no longer detected).

To help in understanding the present disclosure, a discussion of some example touch gestures is provided. In particular, example touch gestures that may be interpreted as commands to scroll a scrollable UI are described. It should be understood that other touch gestures may be used by a user to input a scroll command. Further, other forms of user inputs (e.g., via a mechanical button, via a mouse, via voice) may be used to input a scroll command.

Figure 2C:
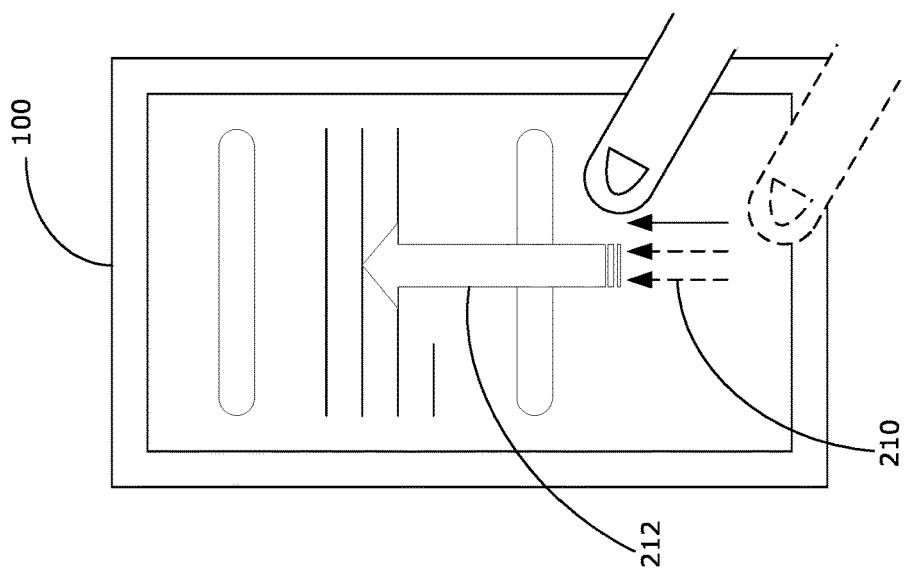
FIGS. 2A-2C illustrate some example touch inputs that may be used to scroll a scrollable UI, in accordance with examples of the present disclosure.
Figure 2B:
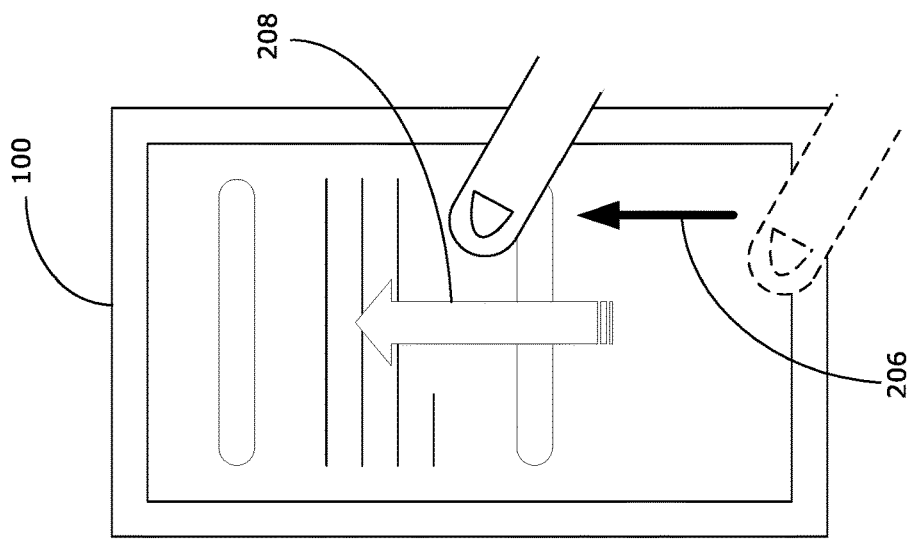
Figure 2A:
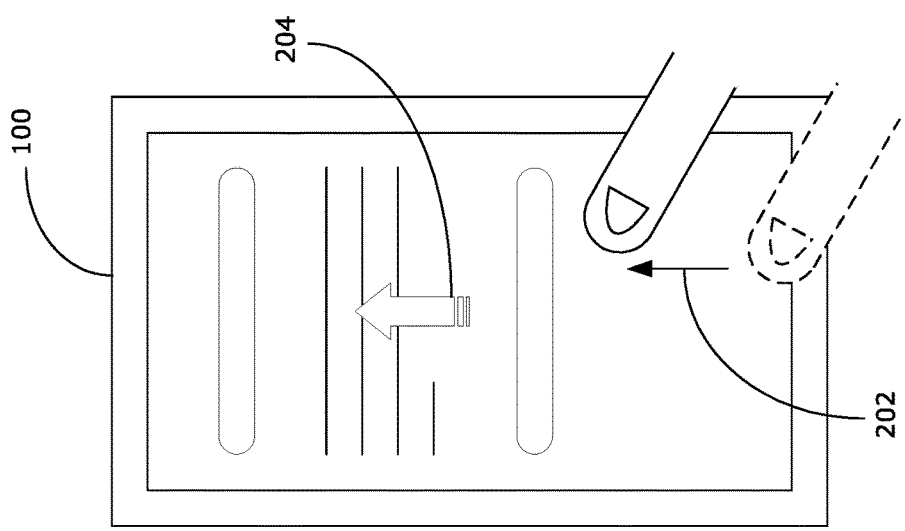

FIGS. 2A-2C illustrate some example touch inputs that may be used to scroll a scrollable UI that is displayed by the apparatus 100. It should be noted that FIGS. 2A-2C do not illustrate condensing or scrolling of the UI sections, for simplicity.

FIG. 2A illustrates an example swipe gesture 202, indicated by a short black arrow, that travels a relatively short distance and/or is performed at a relatively slow speed. Based on the parameters of the swipe gesture 202 (e.g., relatively short distance and/or relatively slow speed), the touch input is recognized by the apparatus 100 as a command to scroll the UI at a relatively slow scrolling rate 204, indicated by a short white arrow.

FIG. 2B illustrates another example swipe gesture 206, indicated by a long black arrow, that travels a longer distance and/or is performed at a faster speed compared to the swipe gesture 202 of FIG. 2A. Based on the parameters of this swipe gesture 206 (e.g., longer distance and/or faster speed), this touch input is recognized by the apparatus 100 as a command to scroll the UI at a faster scrolling rate 208, indicated by a longer white arrow, compared to the slow scrolling rate 204 of FIG. 2A.

FIG. 2C illustrates another example swipe gesture 210, indicated by multiple arrows, that comprises multiple swipes performed in succession within a defined time duration. In these examples, multiple swipes performed in quick succession (e.g., the start of one swipe being performed within a defined time duration, such as 100 ms, after the end of a preceding swipe) may together be recognized as a single compound swipe gesture 210. Based on the parameters of this swipe gesture 210 (e.g., number of swipes performed), this touch input is recognized by the apparatus 100 as a command to scroll the UI at a scrolling rate 212, indicated by a white arrow, dependent on the number of swipes (e.g., higher scrolling rate for a higher number of swipes performed).

Although FIGS. 2A-2C illustrate vertical swiping gestures to cause vertical scrolling of the UI, it should be understood that swiping gestures may be performed in other directions and may result in scrolling of the UI in other directions (e.g., horizontal scrolling, diagonal scrolling, etc.).

Figure 3:
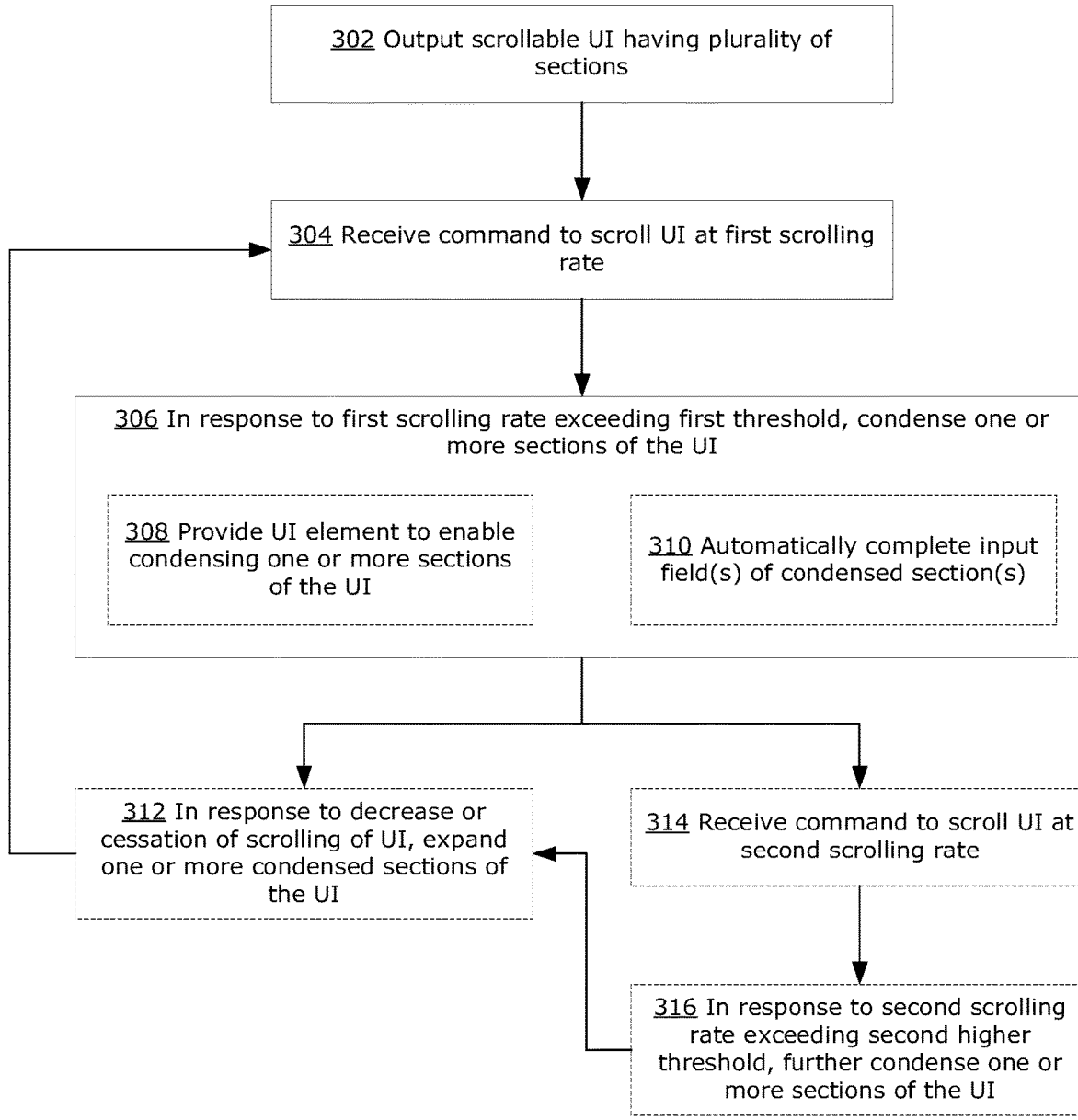
FIG. 3 is a flowchart illustrating an example method, in accordance with examples of the present disclosure.

FIG. 3 is a flowchart illustrating an example method 300 that may be implemented by the apparatus 100. For example, the processing unit 102 of the apparatus 100 may execute instructions, stored in the memory 108, for the condensable UI module 112. In other examples, the method 300 may be encoded as part of the instructions for an application that uses a scrollable UI, rather than as a separate module.

At an operation 302, a scrollable UI is outputted, where the UI has a plurality of sections. For example, the processing unit 102 of the apparatus 100 may cause a display device of the apparatus 100 to output the UI. A scrollable UI may be visually and/or logically divided into a plurality of sections, which may be navigated to by scrolling (e.g., vertically and/or horizontally) through the UI. That is, the size of the UI may be larger than the display area of the display device, such that only a portion of the UI may be viewable at any time, and such that a user may input scrolling commands to bring into view section(s) of the UI. Each section of the UI may be individually condensed. In general, each section of the UI may be defined to have an optional heading (e.g., title, section label, etc.) and contents (e.g., textual content, graphical content, etc.). When a section is condensed, the size of the section may be reduced by reducing the area occupied by the contents while keeping the heading (if present) viewable. For example, if a section of the UI has a textual heading and multiple lines of textual content, then the section may be condensed by reducing the textual content to a single line while maintaining the full textual heading. In some examples, reducing the textual content of a condensed section may include simple truncation of the textual content (e.g., so that only the first line of the section is displayed), may include reducing the size of the textual content (e.g., reducing the font size or spacing), may include showing only a summary text (e.g., a summary text may be predefined for the section, such as a subheading; or a summary text may be automatically generated using machine learning or natural language processing techniques), or may include substituting portions of the textual content with abbreviations, among other possibilities. In another example, if a section of the UI has a textual heading and multiple lines of textual content, then the section may be condensed by omitting the textual content completely while maintaining the textual heading. Other such examples will be discussed further below.

A UI may be divided into sections based on natural logical divisions in the UI. For example, if the UI is for viewing a structured document (e.g., in a text editing/reading application) having headings, each heading may define a respective section of the UI. In another example, if the UI is for an image gallery application where images are sorted chronologically or by category (e.g., categorized by person(s) appearing in each image), the UI may be naturally divided into sections by day/month/year (e.g., sections defined by year, then subsections defined by month, and further subsections defined by day) or by category. In another example, if the UI is for a calendar application, the UI may be divided into sections by day/week/month/year (e.g., sections defined by year, then subsections defined by month, further subsections defined by week, and yet further subsections defined by day). In another example, if the UI is for a fillable form, each heading of the form may define a respective section of the UI. Other such examples of scrollable UIs having multiple sections are considered to be within the scope of the present disclosure.

At an operation 304, a command is received to scroll the UI at a first scrolling rate. For example, the processing unit 102 may receive a signal (e.g., via the I/O interface 104) corresponding to an input command to scroll the UI at a first scrolling rate.

In some examples, the first scrolling rate may be dependent on parameters of the received signal corresponding to the input command. In examples where the received signal is received from a touch-sensitive device, the received signal may indicate a swipe gesture having detected parameters (e.g., detected speed, distance, acceleration and/or number of swipes). Then the first scrolling rate may correspond to at least one of the parameters of the detected swipe gesture (e.g., the first scrolling rate is faster for a faster swipe speed, a larger swipe distance, a greater swipe acceleration and/or a greater number of successive swipes within a defined time duration). In examples where the received signal is received from a mouse device, the first scrolling rate may correspond to a speed, acceleration and/or distance of mouse movement.

In some examples, the first scrolling rate may be predefined and not dependent on parameters of the received signal. For example, if the received signal is received from a keyboard device (e.g., user presses a scroll button), the first scrolling rate may be a fixed rate that is maintained as long as the scroll button is held down.

At an operation 306, in response to the first scrolling rate exceeding a defined first threshold, one or more sections of the UI are condensed. The section(s) of the UI that are condensed may be predefined (e.g., by the developer or designer of the UI), based on the scrolling direction (e.g., if UI is scrolled to bring bottom sections of UI into view, upper sections of the UI may be condensed, and vice versa; if UI is scrolled to bring rightmost sections of UI into view, leftmost sections of the UI may be condensed, and vice versa), based on the content of the sections (e.g., sections containing graphical elements are condensed; or sections that do not require user input are condensed), etc. The condensed section(s) of the UI may be condensed during execution of the command to scroll the UI (i.e., during the time that the UI is still scrolling).

Condensing a section of the UI results in the section occupying a smaller area of the display screen of the apparatus 100. This may be achieved by, for example, reducing the size and/or quality (e.g., resolution) of images in the content of the section, omitting images and other graphical elements from the content of the section, reducing the font of text in the content of the section, reducing the number of lines of text in the content of the section, replacing some or all of the textual content of the section with abbreviations or a summary text, reducing the overall size of the section (e.g., similar to "zooming out" of the section), changing the arrangement of content in the section (e.g., rearranging a grid of images, sometimes referred to as a "gallery" view, into a single row that is horizontally scrollable, sometimes referred to as a "filmstrip" view), removing interactive elements (e.g., user-selectable options, input fields, drop-down menus, etc.) from the content of the section (such that the section becomes a "read-only" section), or replacing input field with information retrieved from a user profile, among other possibilities.

In some examples, the section(s) may be condensed in a stepwise manner, in which the section(s) are condensed by a first amount (e.g., contents condensed by 25%) if the first scrolling rate is in a first range above the first threshold, and condensed by a second greater amount (e.g., contents condensed by 50%) if the first scrolling rate is in a second higher range above the first threshold. In other examples, the condensed section(s) of the UI may be condensed by an amount that is continuous or semi-continuous and proportionate to the first scrolling rate. For example, the amount by which the first scrolling rate exceeds the first threshold may be mapped or normalized to a value in the continuous range of 0.0 to 1.0, and the section(s) of the UI may be condensed by a percentage corresponding to the mapped or normalized value.

In some examples, if the UI includes a section with a sub-section, condensing a section may involve omitting (i.e., hiding) the sub-section (and also any sub-sub-sections within the sub-section), such that only the higher-level section is shown. In some examples, condensing a section of the UI in this manner may enable the UI to be changed from a granular view to a higher-level view. For example, if the UI provides information in chronological sections (e.g., the UI for a calendar application may provide events information sorted by date), the UI may display per-year events at a highest-level section, per-month events at a next-higher-level sub-section, and per-day events at a lowest-level sub-section. Thus, condensing the UI may involve hiding more granular, lower-level chronological sub-sections so that higher-level chronological sections are displayed (e.g., the calendar UI may be originally displaying events on a per-day basis, then condensed to display events on a per-month basis).

Optionally, the operation 306 may include an operation 308 to provide a UI element (e.g., a selectable option, a prompt, etc.) that the user may interact with to enable condensing of the section(s) of the UI. For example, after determining that the first scrolling rate exceeds the first threshold but before condensing the section(s) of the UI, a UI element may be displayed in the UI, which the user may select in order to cause the section(s) of the UI to be condensed.

Optionally, if at least one condensed section of the UI includes one or more input fields, the operation 306 may include an operation 310 to automatically complete the one or more input fields of at least one condensed section of the UI. For example, if an input field of a condensed section requires user input of data that is already stored in the memory 108 of the apparatus 100, the relevant data may be identified (e.g., based on the label assigned to an input field), retrieved from the memory 108 and automatically inputted into the input field. In another example, if the input field has a default value (which may be defined by the developer or designer of the UI), the default value may be automatically inputted into the input field. In this way, condensing the section may result in a condensed section that displays a summary of data that is already available (i.e., without requiring further user input). The condensed section may thus become a read-only version (i.e., without enabled input fields or other elements requiring or permitting user input) of the original section. In some examples, an input field of a condensed section may be automatically completed using data that is retrieved from an external system (i.e., external to the apparatus 100). For example, if the apparatus 100 is in communication with a network server or a software platform (e.g., the UI displayed by the apparatus 100 is the manner in which the network server or software platform receives input from and provides output to the user), condensing the section may involve the apparatus 100 automatically querying the network server or software platform for the relevant data to complete the input field. The condensed section may then be condensed such that the inputted data is displayed (e.g., in a smaller font) in place of a larger input field, or the condensed section may be condensed such that only the heading of the section is displayed together with a label indicating that the section has been completed.

In some examples, if the condensed section includes at least one particular input field that cannot be automatically completed using data that is already available (e.g., the input field requires data that is not contained in a user profile, or the input field does not have a defined default value), the particular input field may remain incomplete and available for user input even after condensing the section. That is, the section may be condensed so that a first input field is automatically completed and replaced with the completed data value where the data is available (or retrievable) while a second input field that cannot be automatically completed may remain displayed (despite the first input field having been removed). In some examples, condensing the section in which the second input field remains incomplete may cause the section to be condensed in a way that the second input field (that still requires user input) is positioned at or close to a focus area of the display screen. In the present disclosure, a focus area of the screen refers to an area of the screen in which a user's gaze or attention is expected to naturally fall or in which a user's gaze or attention has been detected to be currently focused at (e.g., using eye gaze detection algorithms). For example, if the focus area of the display screen is defined (or detected) to be in the top third of the screen, then condensing the section may involve automatically replacing the first input field with the available data and further positioning the condensed section such that the second input field is in the top third of the screen. In this way, condensing the UI section may enable more efficient and/or intuitive user interaction by focusing the user's attention on the input field that requires their input. This may be particularly useful, for example, in scenarios where the UI is being displayed by an apparatus 100 having limited screen size or where the UI includes many input fields but most of which can be automatically completed (e.g., such that it is difficult for the user to identify which input fields actually require their attention). In some examples, positioning an input field at or close to a focus area of the display screen may include automatically enabling or selecting the input field so as to direct further input (e.g., keystrokes from a real or virtual keyboard) to the input field.

In some other examples, the condensed section may be condensed such that all input fields are omitted, even if there is an input field that cannot be automatically completed using available or retrievable data. The heading of such a condensed section may optionally be displayed with a label indicating that the section is incomplete.

Regardless of whether performing the operation 306 includes performing the optional operation 308 and/or optional operation 310, optional operation 312 or optional operation 314 may follow the operation 306.

At the optional operation 312, in response to determining that scrolling of the UI has decreased in rate from the first scrolling rate (i.e., scrolling has slowed down) or that scrolling of the UI has stopped, the condensed section(s) of the UI may be automatically expanded.

Expansion of the condensed section(s) may involve performing an operation that reverses the condensing operation that was performed at the operation 306.

For example, if the condensed section(s) were condensed in a stepwise manner, expansion may be also in a stepwise manner (e.g., expanded to 50% when the scrolling rate of the UI drops below a first threshold, then expanded to 100% when the scrolling of the UI has stopped). In another example if the condensed section(s) were condensed in a continuous manner proportionate to the first scrolling rate, the condensed section(s) may be expanded in a continuous manner proportionate to the decrease in the rate of scrolling of the UI (e.g., corresponding to a normalized rate of scrolling).

In some examples, expanding the condensed section(s) may be performed only after the scrolling rate of the UI has decreased below a defined threshold (which may or may not be different from the first threshold that is used in the operation 306). The threshold for determining whether the condensed section(s) should be expanded may be lower than the threshold used to determine whether the section(s) should be condensed. This hysteresis effect may be used to help provide a smoother user experience (e.g., avoiding quick succession of condensing/expanding section(s)). In some examples, expanding the condensed section(s) may be performed only after the scrolling rate of the UI has decreased in rate from the first scrolling rate for at least a defined time period or scrolling has stopped for at least a defined time period, to help provide a smoother user experience.

In some examples, inertial scrolling may be used to scroll the UI. Inertial scrolling is commonly used in cases where touch inputs (e.g., swipe gestures) are used to scroll the UI. However, inertial scrolling may also be used where other types of inputs are used (e.g., using a scroll button). Inertial scrolling (which may also be referred to as kinetic scrolling, scroll coasting, or scrolling momentum) refers to scrolling of a UI that continues when the user input that causes the scrolling is released and that gradually decays until the scrolling is stopped. This type of scrolling may be considered to mimic the physical effect of, for example, giving a short push to a piece of paper where the paper will slide and then slow to a stop (in this scenario, the scrolling of the UI mimics the piece of paper sliding away from or towards the user). In some examples, inertial scrolling may be designed to closely mimic real-world physics, such as the case where the scrolling rate of the UI and the gradual decay of the scrolling rate depend on the distance, speed, angle and/or acceleration of the detected touch input. In other examples, inertial scrolling may not be true to real-world physics, and may simply be a form of scrolling that gradually decays in rate (rather than stopping abruptly) when the scrolling input is released.

Figure 4:
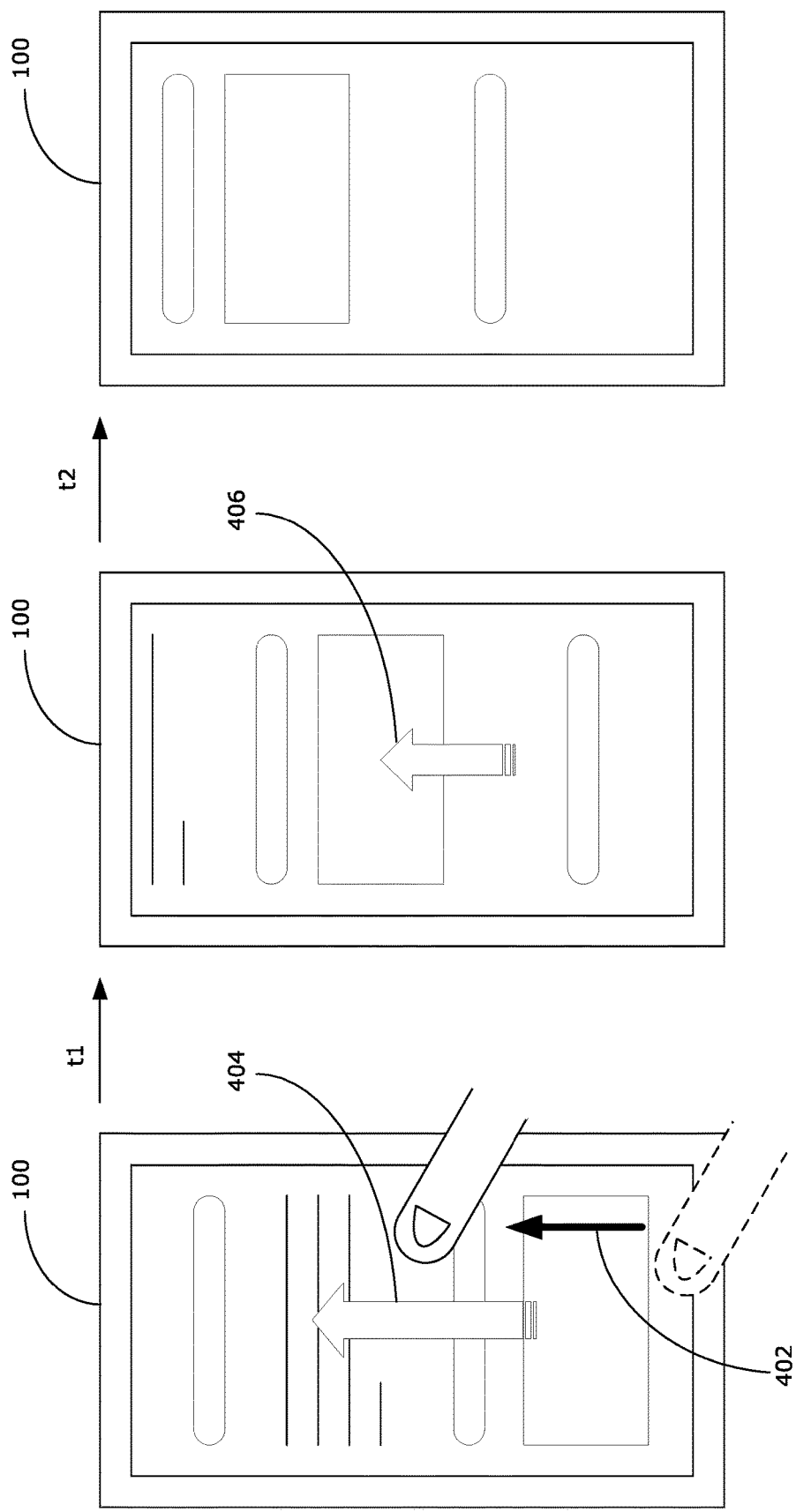
FIG. 4 illustrates a simplified example of how inertial scrolling using touch input may be used to scroll a UI, in accordance with examples of the present disclosure.

FIG. 4 illustrates a simplified example of how inertial scrolling using touch input may be used to scroll a UI. It should be noted that FIG. 4 does not illustrate condensing of the UI sections, for simplicity.

In FIG. 4, a simplified UI is displayed by the apparatus 100. A user performs a swipe gesture 402, indicated by a long black arrow. Based on the parameters of this swipe gesture 402, this touch input is recognized by the apparatus 100 as a command to scroll the UI at a first scrolling rate 404, indicated by a white arrow. When the swipe gesture 402 ends (and other input to scroll the UI is absent), there is a decay in the scrolling of the UI so that after a short time (indicated as t1) the UI is scrolled at a slower scrolling rate 406 (indicated by a shorter white arrow) and after further time (indicated as t2) scrolling of the UI has stopped. As discussed, above, one or more sections of the UI may be condensed when the first scrolling rate 404 exceeds a first threshold and the condensed section(s) may be expanded in response to the scrolling of the UI decreasing to the slower scrolling rate 406.

In some examples, instead of or in addition to automatically expanding the condensed section(s) in response to a decrease in the scrolling rate or a cessation of the scrolling of the UI, a UI element may be provided so that the user may manually select one or more condensed sections to expand. For example, when a section of the UI is condensed at the operation 306, a UI element may be provided at or near the heading of the condensed section that the user may select to expand the condensed section back to its full size. The condensed section may remain condensed, even after scrolling of the UI has slowed or stopped, until the UI element is selected to expand the condensed section. This may enable a user to manually select which condensed section is of interest to view in full.

In some examples, expanding a condensed section may cause the section to be expanded such that the content of the expanded section is displayed in a way that reflects the state of the content prior to the section having been condensed. For example, if the user had navigated to a certain location in the content (e.g., had scrolled down partway in the content), the certain location may be saved as a checkpoint. Then, when the section is expanded again, the content may be automatically displayed at the checkpoint location (e.g., in the middle of the content in the section, rather than at the start of the content).

In some examples, expansion of a condensed section may cause the section to be expanded such that the expanded section is displayed in a way that a particular portion of the expanded section is positioned in a defined or detected focus area of the screen. For example, if the section includes an input field that requires user input (e.g., the input field could not be automatically completed using available data) then when the section is expanded the section may be positioned such that the input field requiring user input is positioned within the focus area of the screen. It should be noted that if there are other input fields that have been automatically completed using available (or retrievable) data when the section was previously condensed, then those input fields may be displayed with the data already filled in when the section is expanded.

In some examples, if the condensed section is expanded in response to user selection (e.g., a user manually selects the heading of the condensed section or selects a UI element provided at or near the heading), the user may be provided with an additional option to expand the section at the checkpoint location or to expand the section at the start of the section. In some examples, a preview of the checkpoint location may be displayed (e.g., a portion of textual content or a thumbnail of graphical content corresponding to the checkpoint location), to enable the user to be informed of the checkpoint location prior to the user making a selection to expand the section at the checkpoint location.

Following optional operation 312, the method 300 may return to the operation 304 to receive another command to scroll the UI.

Returning to the operation 306, optional operation 314 may follow the operation 306.

At the optional operation 314, a command is received to scroll the UI at a second scrolling rate that is higher than the first scrolling rate. For example, the processing unit 102 may receive another signal (e.g., via the I/O interface 104) corresponding to an input command to scroll the UI at the second scrolling rate.

The command to scroll the UI at the second scrolling rate may be received via the same input modality as the command to scroll the UI at the first scrolling rate (received at the operation 304). For example, if a touch input is used to scroll the UI at a first scrolling rate (e.g., using a first swipe gesture having a first speed, distance and/or acceleration), then another touch input may be used to scroll the UI at a faster second scrolling rate (e.g., using a second swipe gesture having a greater second speed, distance and/or acceleration).

At an optional operation 316 following the optional operation 314, in response to determining that the second scrolling rate exceeds a second threshold (that is higher than the first threshold considered at the operation 306), one or more sections of the UI are further condensed.

This further condensation of the section(s) of the UI may include further condensing one or more sections of the UI that had already been partially condensed in response to the first scrolling rate. For example, at the operation 306, when it is determined that the first scrolling rate exceeds the first threshold, section(s) of the UI may be condensed to a first semi-condensed state. A semi-condensed state may be a state in which a second has its content reduced in size (e.g., reduced to occupy only 50% of the original area, or having large graphical elements removed from the content) but the content has not been completely omitted. When, at the operation 316, it is determined that the second scrolling exceeds the second higher threshold, the one or more of the semi-condensed section(s) may be further condensed to a second fully-condensed state in which only the heading of the section is preserved while the content is not displayed. It should be noted that not necessarily all of the semi-condensed section(s) may be further condensed (e.g., if a semi-condensed section does not have any graphical elements to remove then that section may not be further condensed).

In another example, in the semi-condensed state, a first category of visual elements may be omitted from the condensed section(s) of the UI. For example, large visual elements, such as images, UI buttons or animation may be omitted in the semi-condensed state. Then, when one or more of the semi-condensed section(s) are further condensed in response to the second scrolling rate exceeding the second higher threshold, a second category of visual elements may be further omitted (in addition to the already omitted first category of visual elements). The second category of visual elements may be smaller than those of the first category, for example text or small icons may be in the second category of visual elements. The different categories of visual elements that may be omitted/displayed in different condensed states may be predefined (e.g., by a designer or developer of the UI), may be a set default (e.g., set by the manufacturer of the apparatus 100), or may be determined dynamically (e.g., based on number of visual elements, based on which visual elements occupy the most area, based on which visual elements require more processing power to render, etc.), among other possibilities.

In some examples, further condensation of one of more sections of the UI may include condensing section(s) that had not been condensed in response to the first scrolling rate exceeding the first threshold. For example, when the first scrolling rate is determined to exceed the first threshold (at the operation 306), only one section of the UI may be condensed (e.g., if the UI is being scrolled down to view lower sections of the UI, only the uppermost section of the section may be condensed at first); and when the second scrolling rate is determined to exceed the second higher threshold (at the operation 316), additional or all sections of the UI may be condensed (e.g., if the UI is scrolled down even faster, all sections of the UI except the bottommost section may be condensed).

Other such manner of further condensing section(s) of the UI in response to the second scrolling rate exceeding the second higher threshold may be implemented.

In some examples, if the second scrolling rate exceeds a maximum scrolling rate, a UI element (e.g., a selectable option, a prompt, etc.) may be provided that the user may interact with to cause the UI to be scrolled to the topmost (or bottommost, leftmost, rightmost, etc. depending on the direction of scrolling) section of the UI, or that the user may interact with to display a table of contents, for example.

Following the optional operation 316, the method 300 may proceed to optional operation 312 or may return to operation 304.

Although FIG. 3 illustrates operations for condensing section(s) of the UI in response to first and second scrolling rates, it should be understood that the method 300 may be similarly extended to enable further condensing of section(s) of the UI in response to third, fourth, etc. scrolling rates that differ from the first and the second scrolling rates. For example, optional operations 314 and 316 may be performed to even further condense one or more sections of the UI in response to an even faster third scrolling rate that exceeds a third threshold that is higher than the second threshold.

In some examples, in addition to or instead of further condensing section(s) of the UI in response to a second scrolling rate that exceeds a second higher threshold, the section(s) of the UI may be condensed proportionate to the amount by which the scrolling rate of the UI exceeds the first threshold. For example, the operation 306 may involve not only determining that the first scrolling rate exceeds the first threshold but also the amount by which the first scrolling rate exceeds the first threshold. The condensed section(s) may then be condensed by an amount proportionate to the amount by which the first scrolling rate exceeds the first threshold. Then, if the user provides further input to scroll the UI faster (e.g., performs another faster swipe gesture), the scrolling rate of the UI is increased and the condensed section(s) may be further condensed proportionate to the increase in scrolling rate.

Some example implementations of the method 300 are now discussed. Examples are illustrated in which a command to scroll the UI is inputted using certain input modalities (e.g., touch inputs), however it should be understood that other input modalities for inputting a scroll command (e.g., via a mechanical button, via a mouse, etc.) may be used. These examples are provided only for the purpose of illustration and are not intended to be limiting.

Figure 5A:
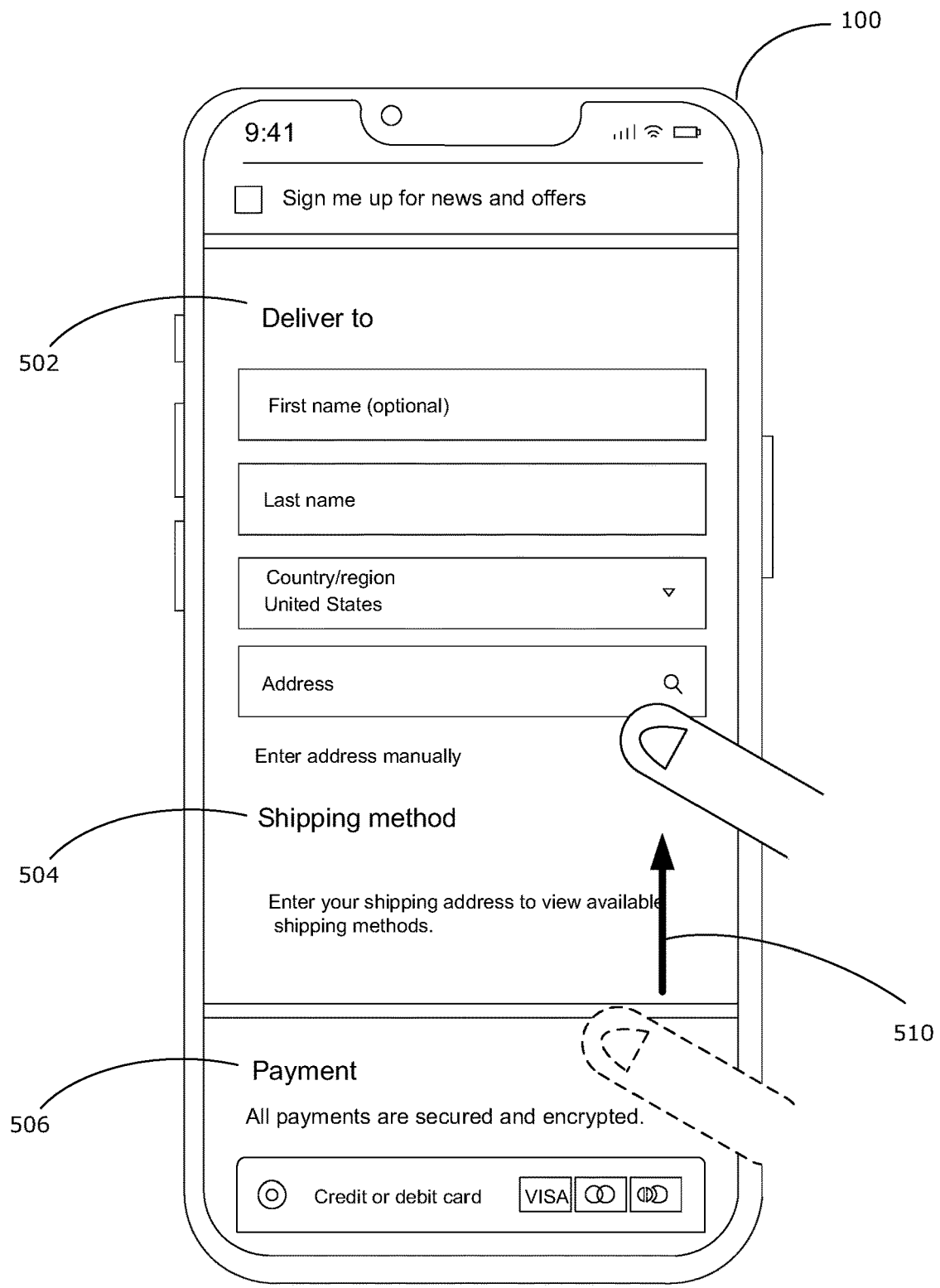
FIGS. 5A and 5B illustrate an example implementation of the method of FIG. 3, in which sections of the UI include input fields, in accordance with examples of the present disclosure.
Figure 5B:
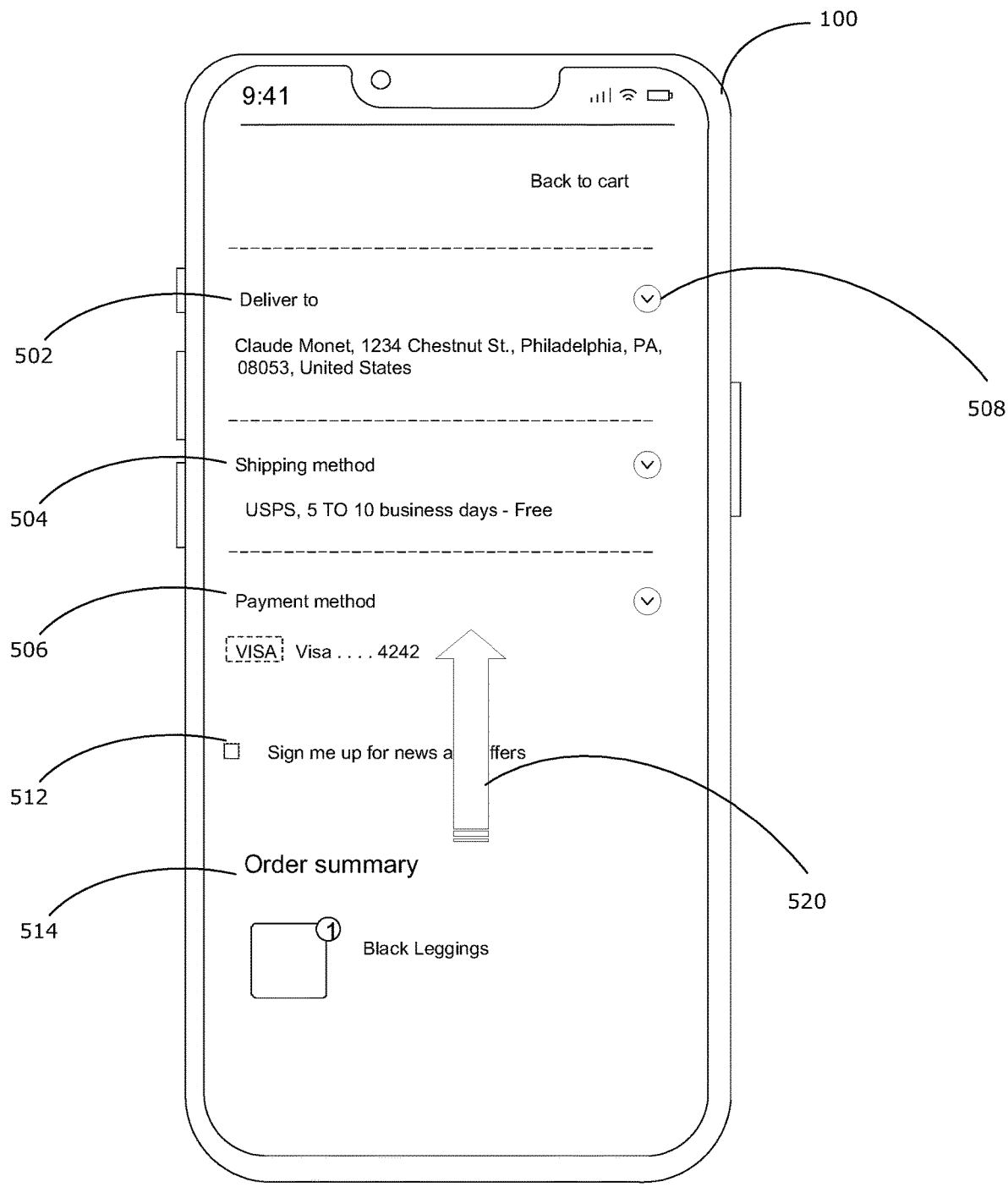

FIGS. 5A and 5B illustrate an example implementation of the method 300 in which, when one or more sections of the UI are condensed and the condensed section(s) include input fields, the input fields are automatically completed (e.g., as described above).

As shown in FIG. 5A, the apparatus 100 displays a UI (in this example, a UI for a checkout process, which may be provided by an online shopping application for example) having multiple sections 502, 504, 506, namely a delivery address input section 502, a shipping method selection section 504 and a payment selection section 506. Each of the sections 502, 504, 506 includes at least one input field (e.g., a text input field, a selection button, etc.) requiring using input. As shown in FIG. 5A, a swipe gesture 510 is detected as touch input, which is processed as a signal corresponding to an input command to scroll the UI at a first scrolling rate 520 as indicated in FIG. 5B (e.g., the first scrolling rate may be based on the detected parameters of the swipe gesture 510). In response to determining that the first scrolling rate 520 exceeds a first threshold, the sections 502, 504, 506 of the UI are condensed as shown in FIG. 5B.

In FIG. 5B, the sections 502, 504, 506 have been condensed (i.e., the condensed size of each of the sections 502, 504, 506 in FIG. 5B occupies a smaller area of the display screen compared to the original size of the corresponding sections 502, 504, 506 in FIG. 5A). In this example, a UI element 508 has been added to the heading of each of the condensed sections 502, 504, 506, which provides a selectable option to expand the condensed section.

The input fields of the delivery address input section 502 has been automatically completed with available user data such as the user's preferred shipping address; the input field of the shipping method selection section 504 has been automatically completed with selection of a default value such as a free shipping option; and the input field payment selection section 506 has been automatically completed with available user data such as selection of a credit card payment and the user's stored credit card number. The data that is used to complete the input fields of the condensed sections 502, 504, 506 may be retrieved from local memory 108 of the apparatus (e.g., the memory 108 may cache data that the user has previously inputted into similar input fields) and/or may be retrieved from an external system such as a network server or a software platform. For example, if the UI is used to complete a checkout transaction on an e-commerce platform, the apparatus 100 may query the e-commerce platform for user data (e.g., preferred shipping address, preferred shipping method, preferred payment method, etc.) stored in a user profile maintained by the platform. The platform may provide the apparatus 100 with the user data in response to the query, which the apparatus 100 may use to automatically complete the input fields of the condensed sections 502, 504, 506.

Condensing of the sections 502, 504, 506 decreases the area occupied by the sections 502, 504, 506 such that other section(s) of the UI may be brought into view. In this example, additional sections 512 and 514 are brought into view, namely a sign-up section 512 and an order summary section 514. Notably, the sign-up section 512 includes an input field (in this example, a checkbox) that cannot be automatically completed (e.g., the user profile does not include information indicating whether the user would like to automatically sign up to newsletters). Thus, the input field of the sign-up section 512 remains incomplete and is not replaced by automatically retrieved data (unlike the sections 502, 504, 506). In some examples, in response to determining that the first scrolling rate 520 exceeds the first threshold, in addition to condensing the sections 502, 504, 506 the UI may also be automatically positioned such that the sign-up section 512 (which is a section having an input field that still requires user input) is positioned in a focus area of the display screen (e.g., in the top half or top third of the display screen, or in a portion of the screen where an eye gaze estimation algorithm has detected the user's gaze to be focused).

Thus, as illustrated by the example of FIGS. 5A and 5B, examples of the present disclosure may simplify a user's interactions with an apparatus 100 by condensing sections of a UI and automatically completing input fields of the condensed sections, in response to a scrolling command. Further, in some examples, the user's attention may be more efficiently drawn to an input field that requires their input. In this way, the limited display screen of the apparatus 100 may be used more efficiently, and the number of user interactions (and the use of computer resources required to process such interactions) may be reduced.

Figure 6A:
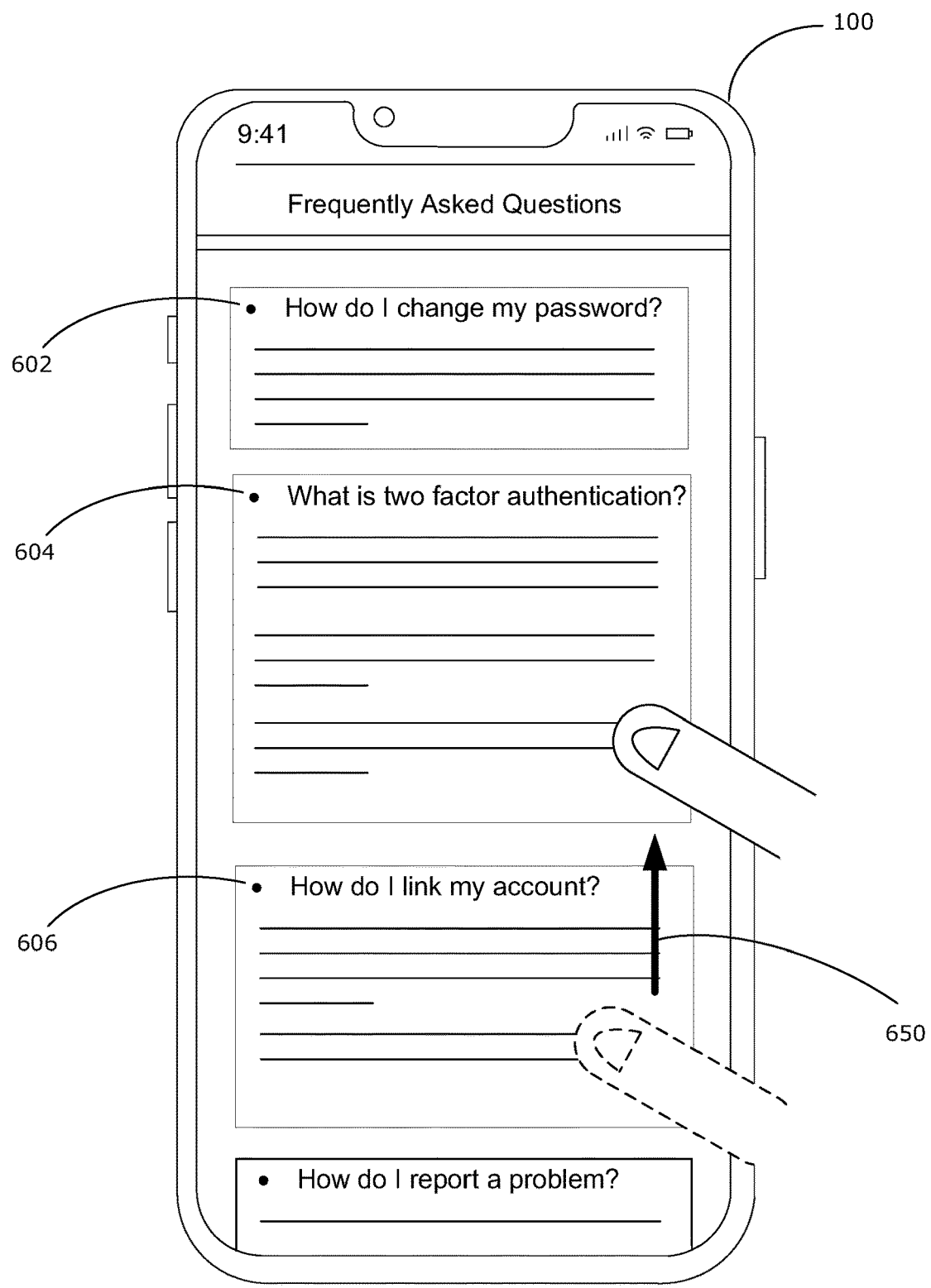
FIGS. 6A-6C illustrate another example implementation of the method of FIG. 3, in which sections of the UI are condensed and expanded proportionate to the scrolling rate, in accordance with examples of the present disclosure.
Figure 6B:
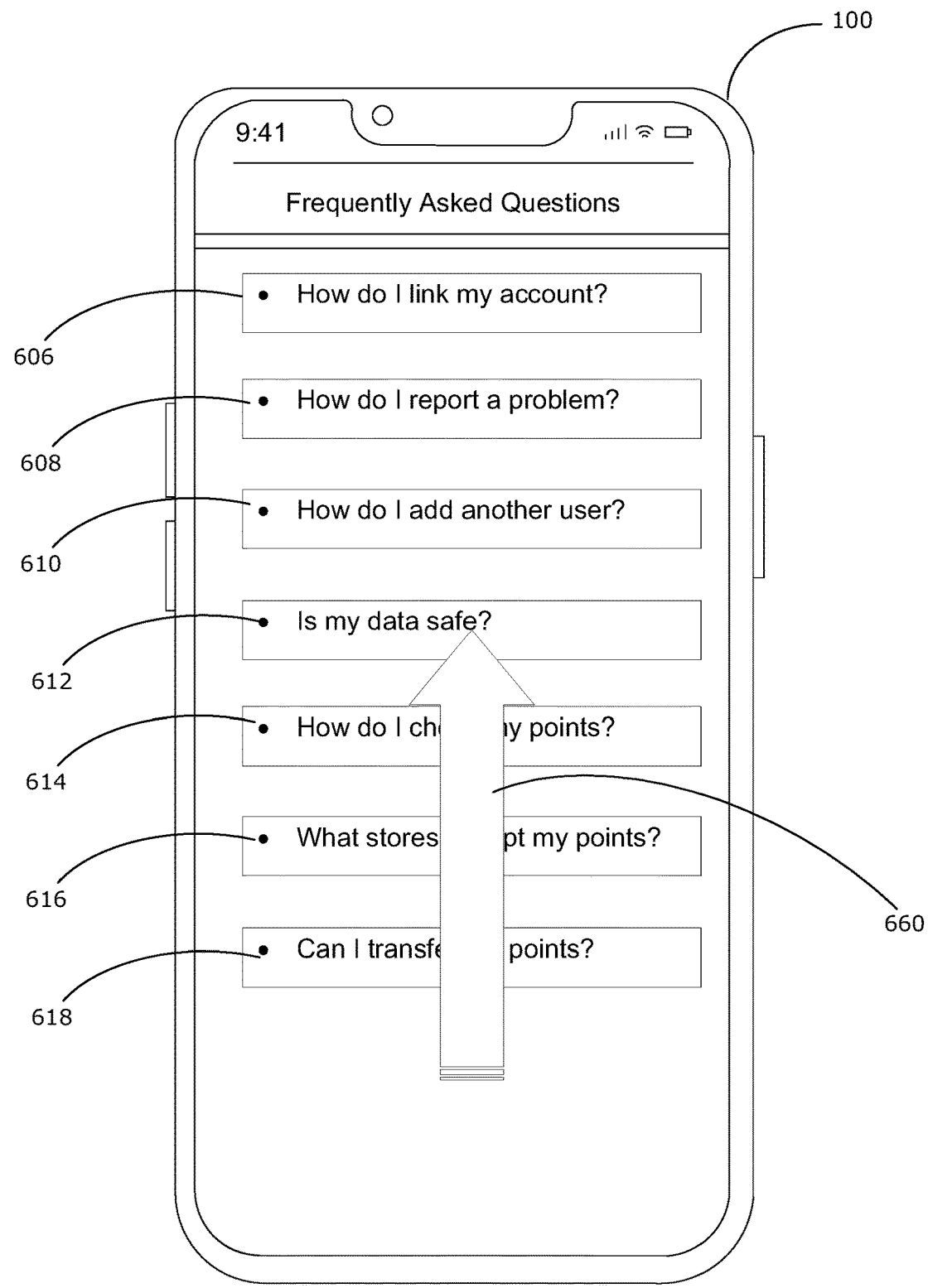
Figure 6C:
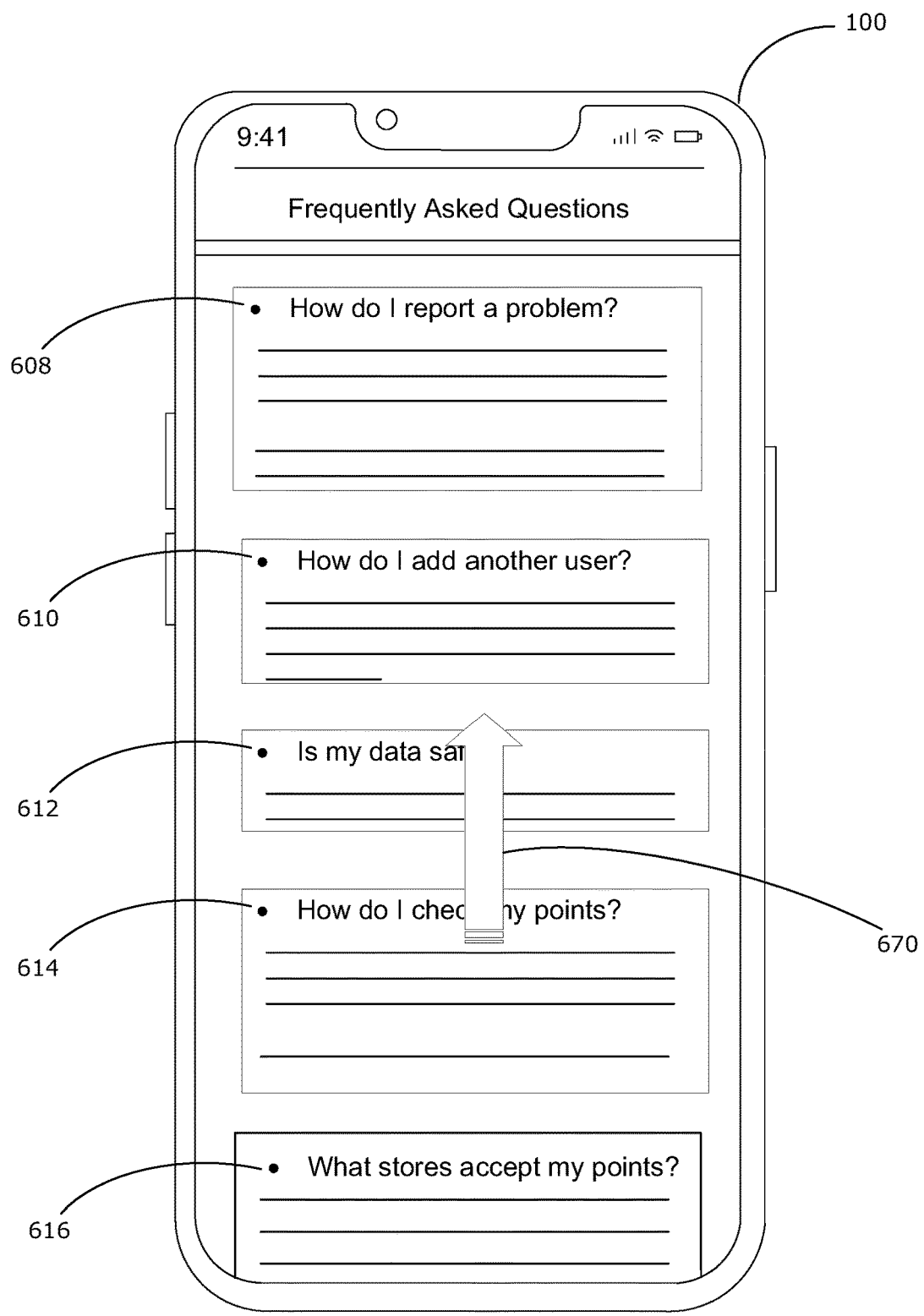

FIGS. 6A-6C illustrate another example implementation of the method 300 in which, one or more sections of the UI are condensed and expanded proportionate to the scrolling rate of the UI (e.g., as described above). Further, FIGS. 6A-6C illustrate and example in which inertial scrolling is implemented.

As shown in FIG. 6A, the apparatus 100 displays a UI (in this example, a UI for viewing a structured document, such as a "Frequently Asked Questions" page which may be provided by an online website) having multiple sections 602, 604, 606, each corresponding to a respective section of the document (e.g., each corresponding to a respective question). Each of the sections 602, 604, 606 includes a heading (e.g., a question) and text content (e.g., an answer to the question). As shown in FIG. 6A, a swipe gesture 650 is detected as touch input, which is processed as a signal corresponding to an input command to scroll the UI at a first scrolling rate 660 as indicated in FIG. 6B (e.g., the first scrolling rate may be based on the detected parameters of the swipe gesture 650).

The UI is scrolled up, as shown in FIG. 6B, to bring into view lower sections of the UI (which were previously hidden) and higher sections of the UI become hidden. In this example, higher sections 602, 604 which were displayed in FIG. 6A have been scrolled out of view while lower sections 608 to 618 have been scrolled into view. At the same time, in response to determining that the first scrolling rate 660 exceeds a first threshold, the sections 606 to 618 of the UI are condensed.

In this example, the first scrolling rate 660 is at a sufficiently high rate (e.g., the scrolling rate 660 exceeds the first threshold by a large amount; or the scrolling rate 660 exceeds a second threshold higher than the first threshold) to cause the sections 606 to 618 of the UI to become fully condensed (in this example, when fully condensed, the text contents of the sections 606 to 618 are completely omitted and only the headings of the sections 606 to 618 are displayed). Because the sections 606 to 618 have been condensed, more sections of the structured document can be viewed at once in the UI, thus enabling the user to more easily and efficiently identify the section of interest, and enabling faster navigation through the document.

In this example, inertial scrolling is implemented, such that after the swipe gesture 650 ends and there is no further swipe gesture (or other scrolling command) from the user, the scrolling rate of the UI automatically decreases over time. As shown in FIG. 6C, some time after the end of the swipe gesture 650, the scrolling rate has decreased from the scrolling rate 660 illustrated in FIG. 6B to a lower scrolling rate 670 (indicated by a shorter white arrow). In response to the lower scrolling rate 670, the sections of the UI are automatically expanded proportionate to the scrolling rate 670. In the example shown, the sections 608 to 616 have been partially expanded to a semi-condensed state, such that some of the text contents of the sections 608 to 616 are displayed (although the text content is still partially cut off).

The automatic expansion of condensed sections of the UI, implemented together with inertial scrolling, provides an intuitive and convenient way for a user to navigate the UI with reduced user interactions. Thus, a more efficient UI is provided and computer resources that would otherwise be required to process additional user inputs can be saved.

Figure 7A:
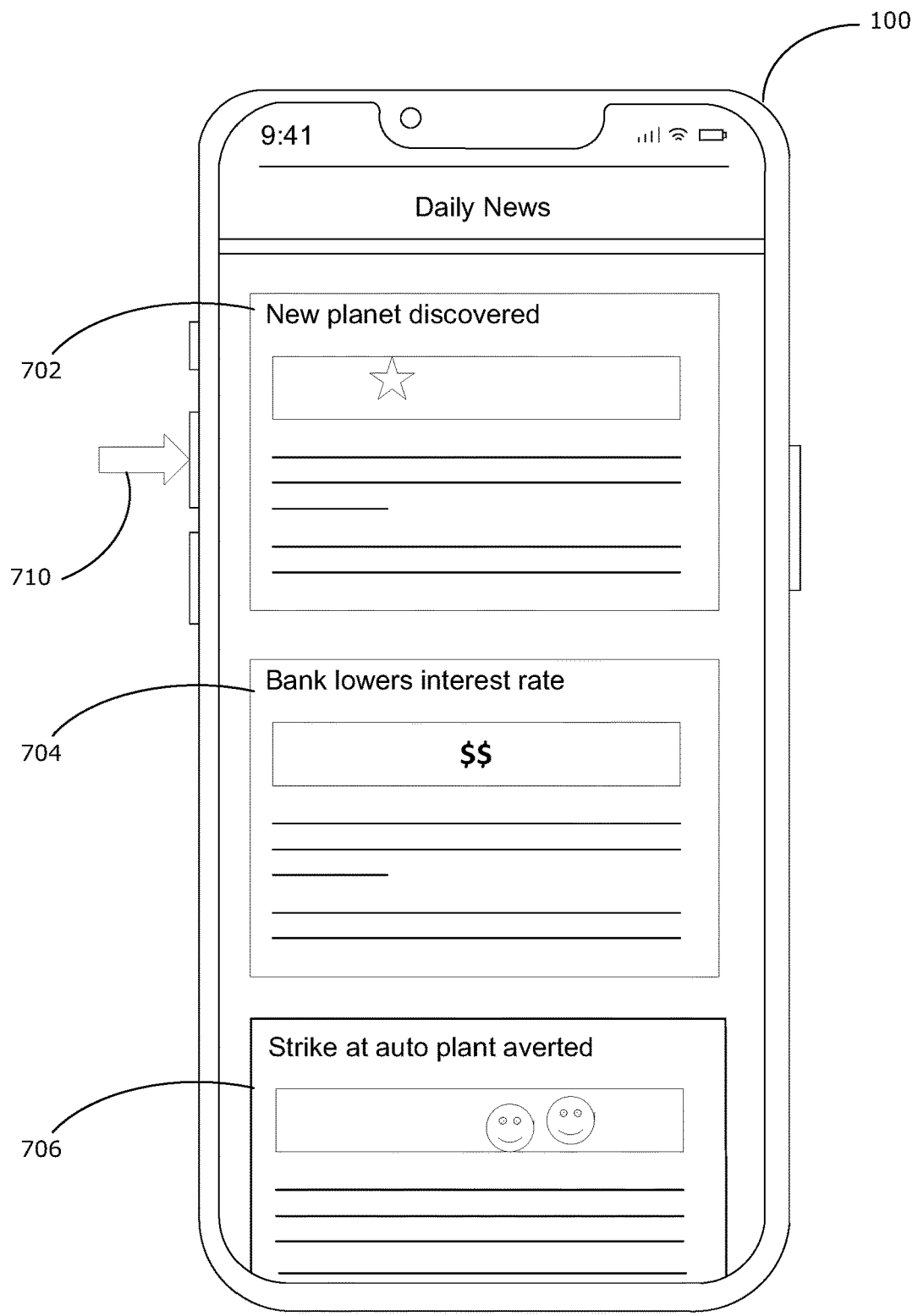
FIGS. 7A and 7B illustrate another example implementation of the method of FIG. 3, in which sections of the UI are condensed by the removal of a category of visual elements, in accordance with examples of the present disclosure.
Figure 7B:
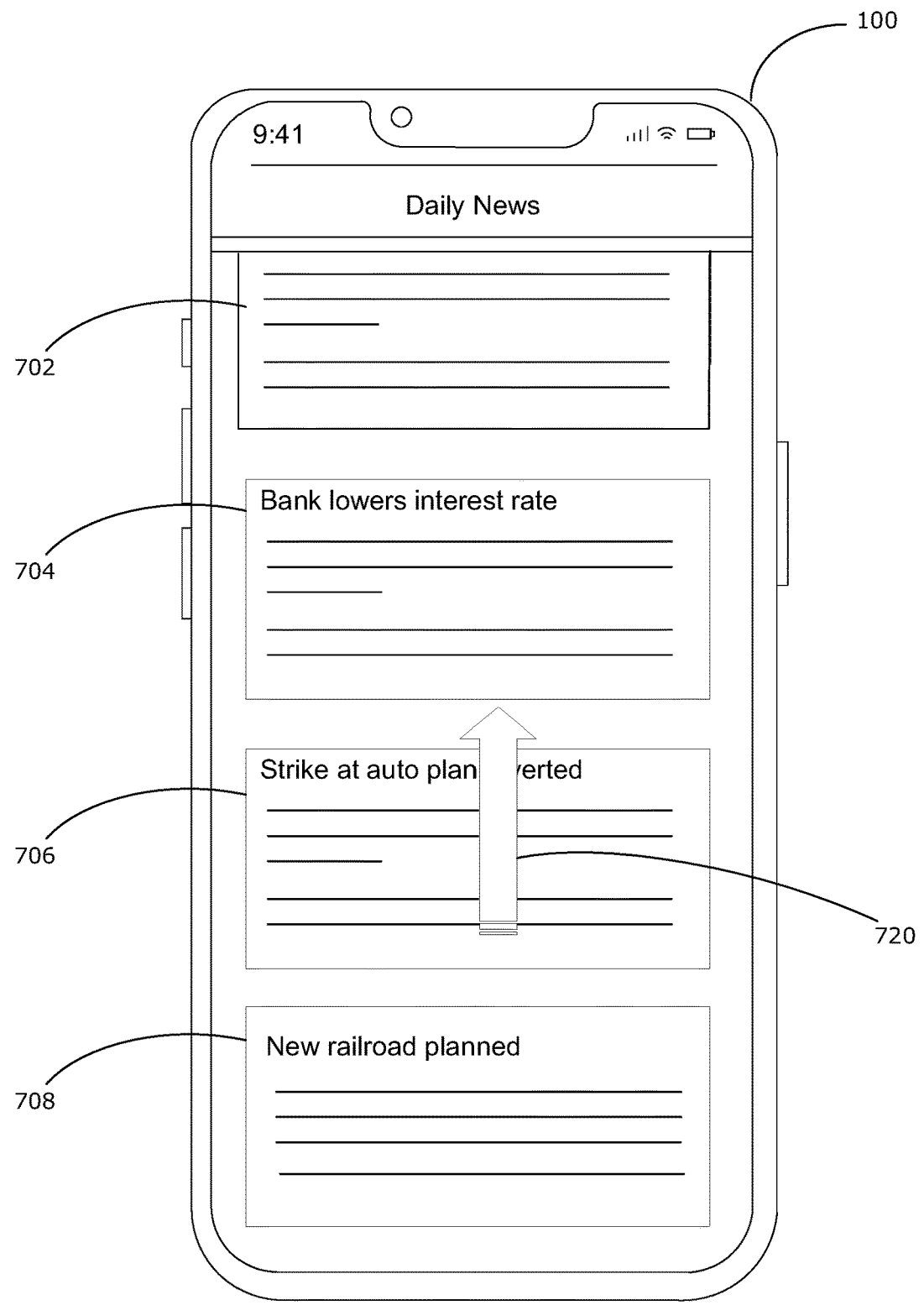

FIGS. 7A and 7B illustrate another example implementation of the method 300 in which one or more sections of the UI are condensed by the removal of a category of visual elements (e.g., as described above).

As shown in FIG. 7A, the apparatus 100 displays a UI (in this example, a UI for viewing a structured document, such as a "Daily News" page which may be provided by an e-reader application) having multiple sections 702, 704, 706, each corresponding to a respective section of the document (e.g., each corresponding to a respective newspaper article). Each of the sections 702, 704, 706 includes a heading (e.g., a headline), graphical content (e.g., image to illustrate the article) and text content (e.g., a summary of the article). As shown in FIG. 7A, a button press 710 is detected, which is processed as a signal corresponding to an input command to scroll the UI at a first scrolling rate 720 as indicated in FIG. 7B (e.g., the first scrolling rate 720 may be based on the parameters of the button press 710, such as the time duration for which the button is held down).

The UI is scrolled up, as shown in FIG. 7B, to bring into view a lower section 708 of the UI and scroll a higher section 702 partially out of view. At the same time, in response to determining that the first scrolling rate 720 exceeds a first threshold, the sections 702 to 708 of the UI are condensed.

In this example, the sections 702 to 708 are condensed by omitting a first category of visual elements (in this case, images) from the sections 702 to 708 while a second category of visual elements (in this case, text) in the sections 702 to 708 remain visible and unchanged. In this way, the user can more quickly navigate through the sections of the UI, because the omission of large visual elements (e.g., images) from the sections enable a greater number of sections of the UI to be displayed at the same time. This may be useful particularly in the case where the apparatus 100 has a small-sized display screen.

Figure 8A:
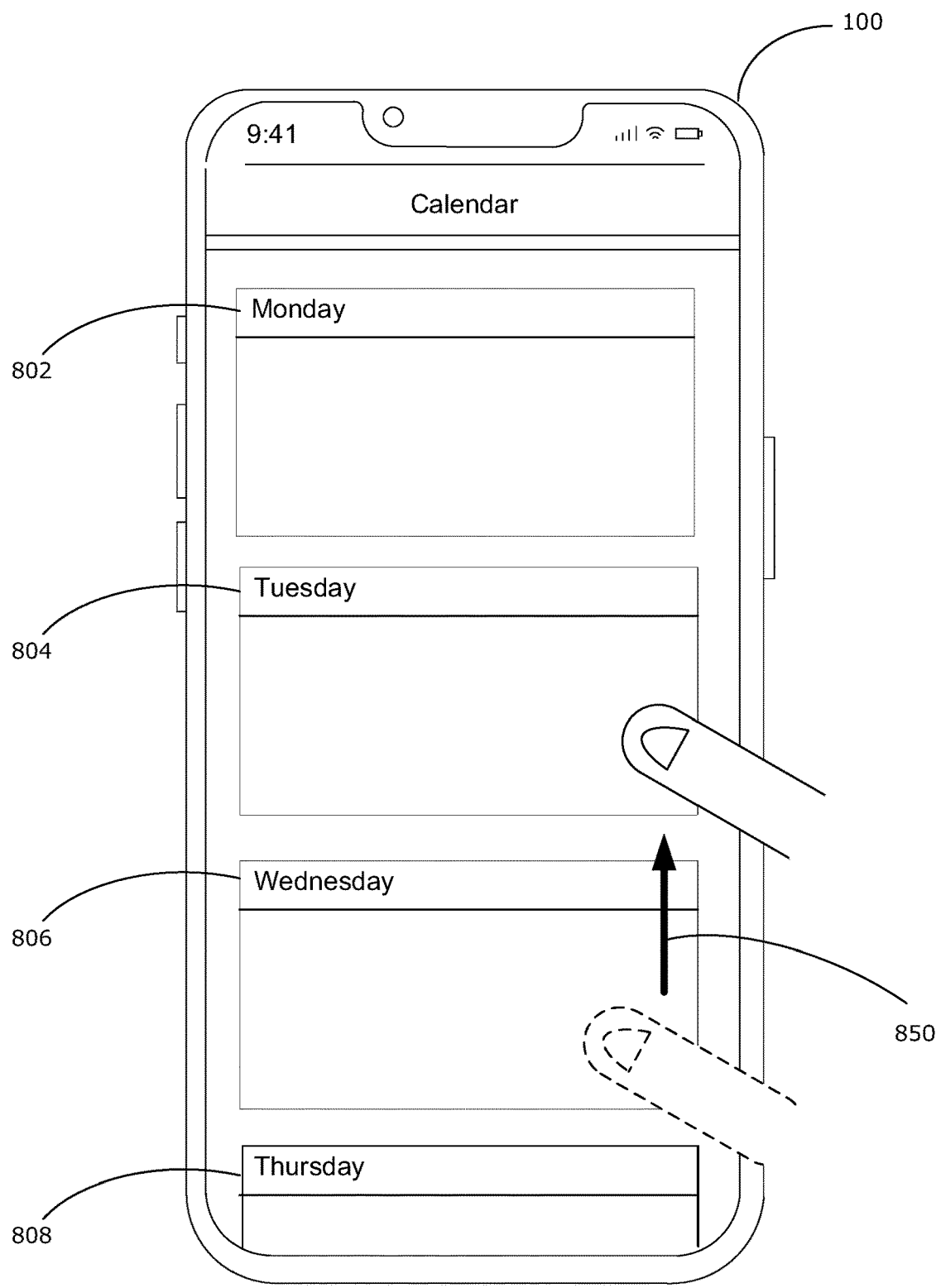
FIGS. 8A-8C illustrate another example implementation of the method of FIG. 3, in which condensing sections of the UI changes the granularity of information displayed, in accordance with examples of the present disclosure.
Figure 8B:
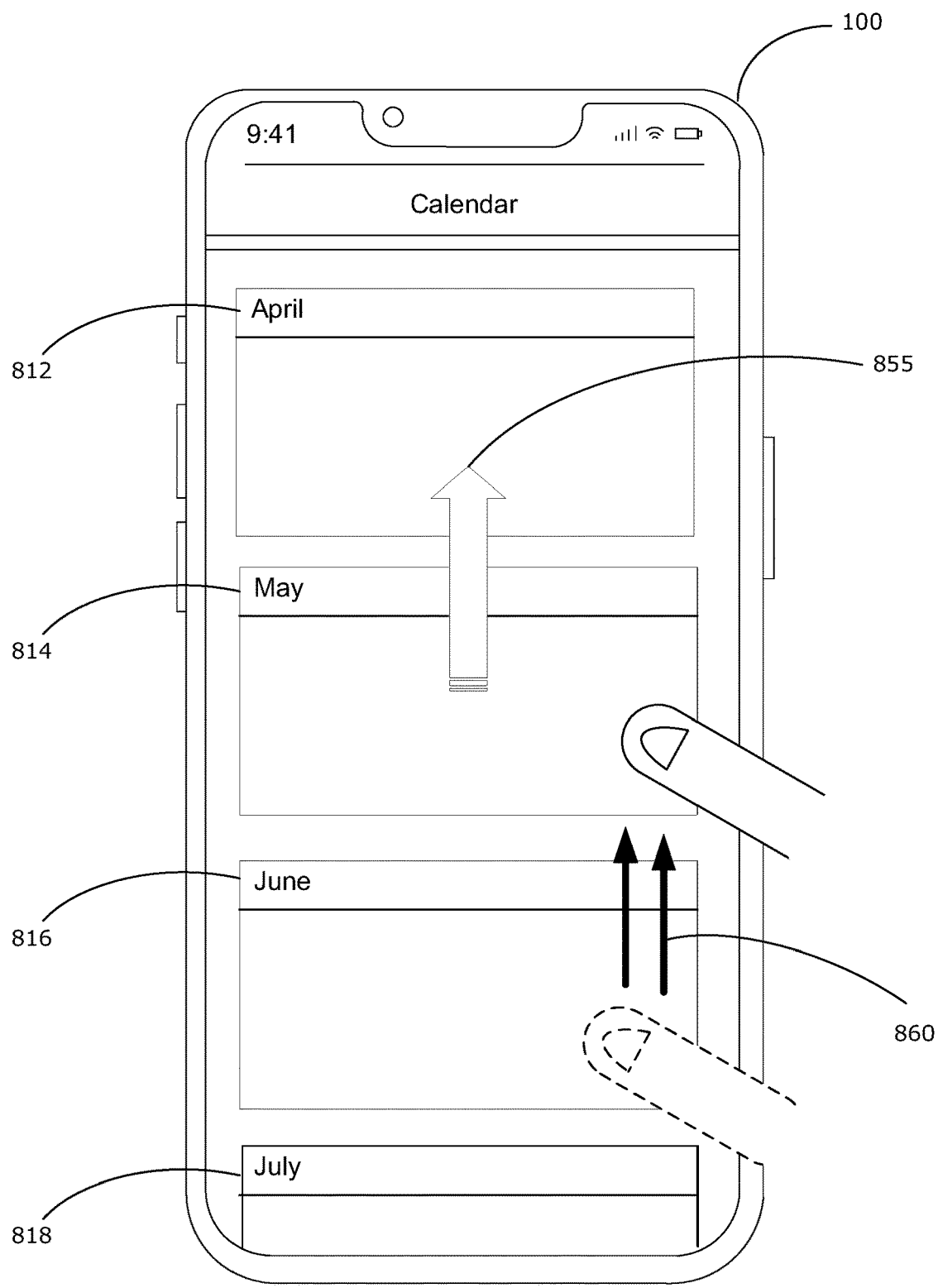
Figure 8C:
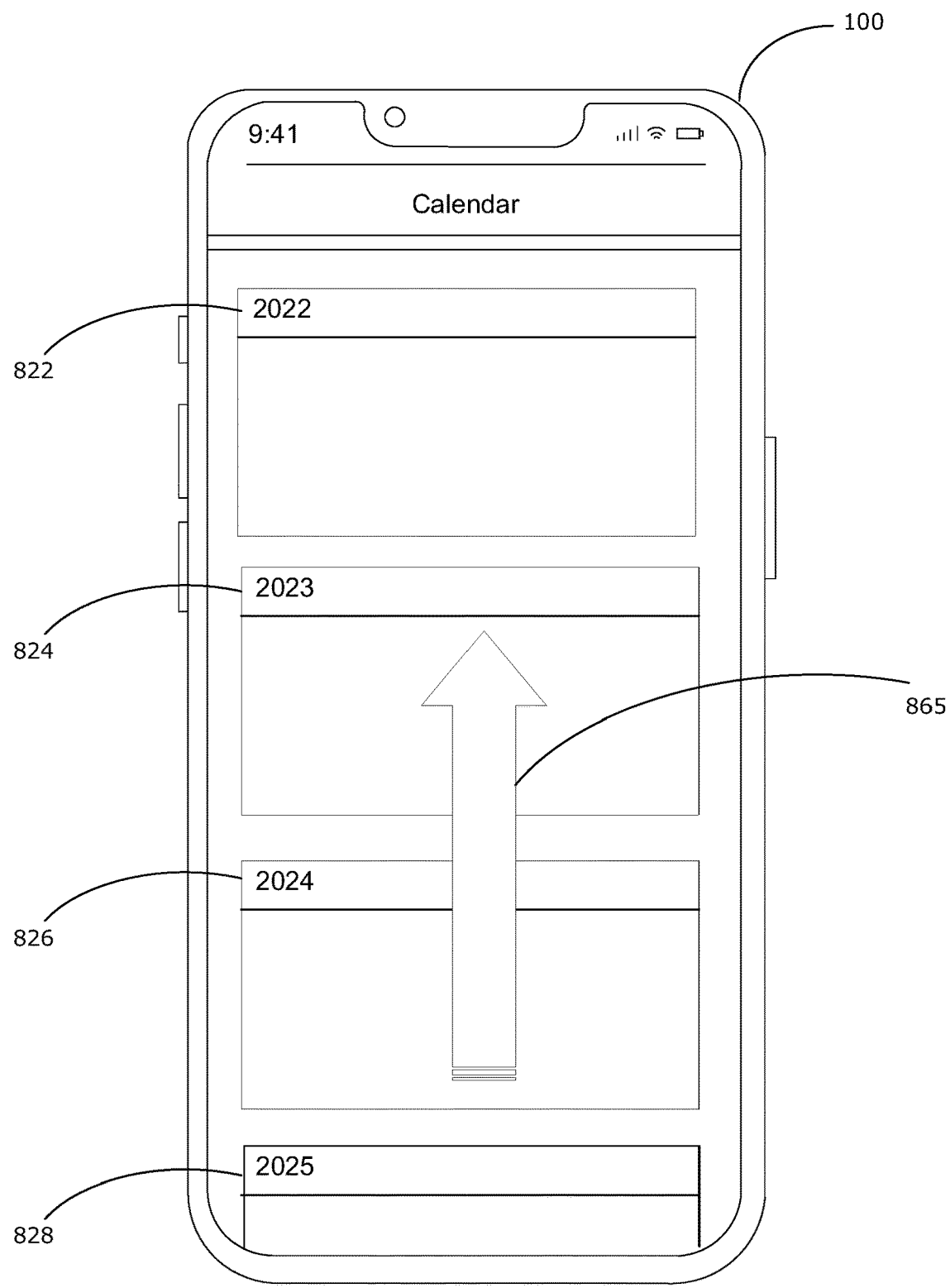

FIGS. 8A-8C illustrate another example implementation of the method 300 in which condensing sections of the UI, in response to the scrolling rate of the UI, results in display of higher-level headings (while lower-level sub-headings are hidden).

As shown in FIG. 8A, the apparatus 100 displays a UI (in this example, a UI for viewing a calendar events, which may be provided by a calendar application) having sections 802 to 808, each corresponding to a respective chronological sub-section (e.g., each corresponding to a respective day). The UI includes higher-level sections (e.g., corresponding to months and years), which encompass the lower-level sections 802 to 808. As shown in FIG. 8A, a swipe gesture 850 is detected as touch input, which is processed as a signal corresponding to an input command to scroll the UI at a first scrolling rate 855 as indicated in FIG. 8B (e.g., the first scrolling rate 855 may be based on the detected parameters of the swipe gesture 850).

As shown in FIG. 8B, in response to determining that the first scrolling rate 855 exceeds a first threshold, the sections 802 to 808 corresponding to lower-level chronological sub-sections (i.e., days) are hidden and instead sections 812 to 818 corresponding to higher-level chronological sections (i.e., months) are displayed. As shown in FIG. 8B, the user provides further touch input, in this case a multi-swipe gesture 860, which is processed as a signal corresponding to an input command to scroll the UI at a faster second scrolling rate 865, indicated by the larger white arrow in FIG. 8C (e.g., the second scrolling rate 865 may be based on the number of detected swipes in the multi-swipe gesture 860). As shown in FIG. 8C, in response to determining that the second scrolling rate 865 exceeds a second higher threshold, the sections 812 to 818 are hidden and instead sections 822 to 828 corresponding to highest-level chronological sections (i.e., years) are displayed.

Thus, as illustrated by the example of FIGS. 8A-8C, examples of the present disclosure may simplify a user's interactions with an apparatus 100 by enabling the user to change the granularity of the information presented using scrolling input. This avoids the need for a user to navigate through a menu, for example, to select a desired granularity of information to display and the use of computer resources required to process such interactions may be reduced. As well, this provides an intuitive and efficient manner for a user to "zoom" out from a more granular, lower-level chronological view (e.g., per-day basis) to a higher-level chronological view (e.g., per-month or per-year basis). FIGS. 8A-8C illustrate how an increase in the scrolling rate of the UI results in the UI being condensed to display higher-level chronological sections. In a similar manner, it should be understood that a decrease in the scrolling rate of the UI may result in the UI being expanded to display lower-level chronological sections (e.g., "zoom" in to view per-day events).

Examples of the present disclosure may be implemented in a variety of UIs for a variety of software applications including, for example, image gallery applications, calendar applications, text reading/editing applications, and online forms, among others.

Although the present disclosure describes some examples in the context of user interactions using touch inputs, it should be understood that these are only exemplary and are not intended to be limiting. Examples of the present disclosure may be implemented using other input modalities to scroll a UI.

Although the present disclosure describes methods and processes with operations (e.g., steps) in a certain order, one or more operations of the methods and processes may be omitted or altered as appropriate. One or more operations may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. An apparatus comprising:
a processing unit communicatively coupled to a display device, the processing unit being configured to:
cause the display device to output a scrollable user interface (UI) having a plurality of sections;
receive at least a first signal corresponding to a first command to scroll the UI at a first scrolling rate;
in response to a determination that the first scrolling rate exceeds a first threshold, condense one or more sections of the plurality of sections of the UI to a first semi-condensed state and into respective one or more condensed sections by reducing granularity of information displayed, wherein each condensed section comprises a higher-level view of the information displayed, and occupies a smaller area on a display screen of the display device than the corresponding one or more sections prior to the condensing;
in response to a determination that scrolling of the UI has decreased in rate from the first scrolling rate and falls below a second threshold, expand the one or more sections of the UI, wherein the second threshold is less than the first threshold and wherein the threshold for determining whether the one or more condensed sections should be expanded is lower than the threshold used to determine whether the one or more sections should be condensed;
receive at least a second signal corresponding to a second command to scroll the UI at a second scrolling rate; and
in response to a determination that the second scrolling rate exceeds a third threshold higher than the first threshold, condense one or more of the one or more sections of the UI to a second further condensed state.

2. The apparatus of claim 1, wherein the processing unit is further configured to:
in response to the determination that the first scrolling rate exceeds the first threshold, condense the one or more sections of the UI by an amount proportionate to the first scrolling rate.

3. The apparatus of claim 1, wherein the one or more sections of the UI are condensed during execution of the first command to scroll the UI.

4. The apparatus of claim 1, wherein scrolling of the UI automatically decreases in rate from the first scrolling rate in absence of input to maintain scrolling of the UI.

5. The apparatus of claim 1, wherein expansion of the one or more sections of the UI is proportionate to a decrease in rate in the scrolling of the UI.

6. The apparatus of claim 1, wherein the processing unit is further configured to determine that scrolling of the UI has decreased in rate from the first scrolling rate for at least a defined time period prior to expanding the one or more sections of the UI.

7. The apparatus of claim 1, wherein, in the first semi-condensed state, a first category of visual elements is omitted from each of the one or more sections of the UI and a second category of visual elements is maintained in each of the one or more of the one or more sections of the UI, and in the second further condensed state both the first and the second categories of visual elements are omitted from each of the one or more of the one or more sections of the UI.

8. The apparatus of claim 1, wherein the processing unit is further communicatively coupled to an input device to receive at least the first signal corresponding to the first command, and wherein the input device is a touch-sensitive device.

9. The apparatus of claim 8, wherein at least the first signal received from the input device represents a swipe gesture and the first scrolling rate corresponds to at least one of a speed, distance or acceleration of the swipe gesture.

10. The apparatus of claim 9, wherein at least the first signal received from the input device indicates a number of swipe gestures and the first scrolling rate corresponds to the number of swipe gestures.

11. The apparatus of claim 9, wherein scrolling of the UI automatically decreases in rate from the first scrolling rate following an end of the swipe gesture and in absence of another swipe gesture.

12. The apparatus of claim 1, wherein the processing unit is further configured to:
in response to the determination that the first scrolling rate exceeds the first threshold, condense each section of the plurality of sections of the UI into respective corresponding condensed sections.

13. The apparatus of claim 1, wherein reducing granularity of information displayed comprises hiding lower-level information throughout the information displayed.

14. A method comprising:
causing a display device of an electronic apparatus to output a scrollable user interface (UI) having a plurality of sections;
receiving at least a first signal corresponding to a first command to scroll the UI at a first scrolling rate;
in response to a determination that the first scrolling rate exceeds a first threshold, condensing one or more sections of the plurality of sections of the UI to a first semi-condensed state and into respective one or more condensed sections by reducing granularity of information displayed, wherein each condensed section comprises a higher-level view of the information displayed, and occupies a smaller area on a display screen of the display device than the corresponding one or more sections prior to the condensing;
in response to a determination that scrolling of the UI has decreased in rate from the first scrolling rate and falls below a second threshold, expand the one or more sections of the UI, wherein the second threshold is less than the first threshold and wherein the threshold for determining whether the one or more condensed sections should be expanded is lower than the threshold used to determine whether the one or more sections should be condensed;
receiving at least a second signal corresponding to a second command to scroll the UI at a second scrolling rate; and
in response to a determination that the second scrolling rate exceeds a third threshold higher than the first threshold, condensing one or more of the one or more sections of the UI to a second further condensed state.

15. The method of claim 14, further comprising:
in response to the determination that the first scrolling rate exceeds the first threshold, condensing the one or more sections of the UI by an amount proportionate to the first scrolling rate.

16. The method of claim 14, wherein scrolling of the UI automatically decreases in rate from the first scrolling rate in absence of input to maintain scrolling of the UI.

17. The method of claim 14, wherein expansion of the one or more sections of the UI is proportionate to a decrease in rate in the scrolling of the UI.

18. The method of claim 14, wherein the first signal corresponding to the first command represents a swipe gesture detected by a touch sensor, wherein scrolling of the UI automatically decreases in rate from the first scrolling rate following an end of the swipe gesture and in absence of another swipe gesture.

19. The method of claim 14, further comprising determining that scrolling of the UI has decreased in rate from the first scrolling rate for at least a defined time period prior to expanding the one or more sections of the UI.

20. The method of claim 14, wherein the one or more sections of the UI are condensed during execution of the first command to scroll the UI.

21. A non-transitory computer readable medium having instructions encoded thereon, wherein the instructions, when executed by a processing unit of an apparatus, cause the apparatus to:
cause a display device of the apparatus to output a scrollable user interface (UI) having a plurality of sections;
receive at least a first signal corresponding to a first command to scroll the UI at a first scrolling rate;
in response to a determination that the first scrolling rate exceeds a first threshold, condense one or more sections of the plurality of sections of the UI to a first semi-condensed state and into respective one or more condensed sections by reducing granularity of information displayed, wherein each condensed section comprises a higher-level view of the information displayed, and occupies a smaller area on a display screen of the display device than the corresponding one or more sections prior to the condensing;
in response to a determination that scrolling of the UI has decreased in rate from the first scrolling rate and falls below a second threshold, expand the one or more sections of the UI, wherein the second threshold is less than the first threshold and wherein the threshold for determining whether the one or more condensed sections should be expanded is lower than the threshold used to determine whether the one or more sections should be condensed;
receive at least a second signal corresponding to a second command to scroll the UI at a second scrolling rate; and
in response to a determination that the second scrolling rate exceeds a third threshold higher than the first threshold, condense one or more of the one or more sections of the UI to a second further condensed state.

* * * * *